(12) United States Patent
Sherry

(10) Patent No.: US 8,097,128 B1
(45) Date of Patent: Jan. 17, 2012

(54) METHOD AND APPARATUS FOR PURIFYING WATER

(76) Inventor: Raymond C. Sherry, Cleburne, TX (US)

( * ) Notice: Subject to any disclaimer, the term of this patent is extended or adjusted under 35 U.S.C. 154(b) by 807 days.

(21) Appl. No.: 12/156,217

(22) Filed: May 31, 2008

Related U.S. Application Data

(60) Provisional application No. 60/932,752, filed on Jun. 1, 2007.

(51) Int. Cl.
*B01D 19/00* (2006.01)
*B05B 17/00* (2006.01)
*B05B 17/04* (2006.01)

(52) U.S. Cl. .......... 203/11; 210/180; 210/188; 210/294; 210/512.1; 203/10; 203/88; 203/90; 202/177; 202/185.1; 202/236; 96/185; 96/209; 95/249

(58) Field of Classification Search .............. 210/97, 210/143, 188, 294, 512.1, 180; 202/177, 202/185.1, 236; 96/185, 209; 95/249; 203/10, 203/11, 88, 90
See application file for complete search history.

(56) References Cited

U.S. PATENT DOCUMENTS

| | | | |
|---|---|---|---|
| 3,625,881 A | 12/1971 | Chambers | |
| 3,648,438 A | 3/1972 | Arbogast | |
| 3,884,767 A | 5/1975 | Pottharst, Jr. | |
| 3,930,960 A | 1/1976 | Taylor | |
| 3,956,072 A | 5/1976 | Huse | |
| 4,267,022 A | 5/1981 | Pitcher | |
| 4,310,387 A | 1/1982 | Sadhukhan | |
| 4,319,964 A | 3/1982 | Katz et al. | |
| 4,422,299 A | 12/1983 | Sorensen | |
| 4,511,376 A | 4/1985 | Coury | |
| 4,536,293 A | 8/1985 | Babineaux, III | |
| 4,941,330 A | 7/1990 | Williamson | |
| 5,207,928 A | 5/1993 | Lerner | |
| 5,227,027 A | 7/1993 | Topper | |
| 5,248,387 A | 9/1993 | Hansen | |
| 5,550,410 A | 8/1996 | Titus | |
| 5,810,975 A | 9/1998 | Bourdel | |
| 5,853,549 A | 12/1998 | Sephton | |
| 5,922,174 A | 7/1999 | Youngner | |
| 5,968,312 A | 10/1999 | Sephton | |
| 6,155,047 A | 12/2000 | Streetman | |
| 6,635,149 B1 | 10/2003 | Campbell et al. | |
| 6,685,802 B1 | 2/2004 | Nazzer | |
| 6,709,593 B2 | 3/2004 | Lorenz | |
| 6,740,205 B2 | 5/2004 | Molintas | |
| 6,802,981 B2 | 10/2004 | Ryazanova et al. | |
| 6,843,832 B2 * | 1/2005 | Greene et al. | 210/512.1 |
| 6,932,889 B1 | 8/2005 | Holcomb | |
| 6,936,140 B2 | 8/2005 | Paxton et al. | |
| 6,984,292 B2 | 1/2006 | Kresnyak et al. | |

(Continued)

OTHER PUBLICATIONS

Onsite Water Treatment—Mobile Evaporators, 4 pages, 2006.

(Continued)

*Primary Examiner* — David A Reifsnyder
(74) *Attorney, Agent, or Firm* — Roger N. Chauza, PC

(57) ABSTRACT

An efficient flash evaporation water purification system located at a hydrocarbon well site. An internal combustion engine uses hydrocarbon fuel from the well and drives a pump to pressurize production water from the well. The engine also generates thermal energy used to preheat the production water. An electrical generator is also driven by the engine to produce electrical power for the water purification system, as well as produce AC power for off-site consumers.

26 Claims, 14 Drawing Sheets

U.S. PATENT DOCUMENTS

| | | | |
|---|---|---|---|
| 7,037,430 | B2 | 5/2006 | Donaldson et al. |
| 7,306,735 | B2 | 12/2007 | Baggott et al. |
| 7,428,926 | B2 | 9/2008 | Heins |
| 7,608,935 | B2 | 10/2009 | Scherzer |
| 7,963,459 | B1 * | 6/2011 | Sherry ............... 239/13 |
| 2003/0230534 | A1 | 12/2003 | Donaldson et al. |
| 2004/0140264 | A1 | 7/2004 | Ward et al. |
| 2004/0140270 | A1 | 7/2004 | Simmons |
| 2004/0261952 | A1 | 12/2004 | Hart et al. |
| 2006/0011546 | A1 | 1/2006 | Livingston |
| 2007/0048212 | A1 | 3/2007 | Bierle et al. |
| 2008/0073200 | A1 | 3/2008 | Godshall et al. |

OTHER PUBLICATIONS

Altela Treating Water Naturally—Our Technology, 2009, Internet printout, 2 pages.

Altela Treating Water Naturally—Oil and Gas Industry, Produced Water, 2009, Internet printout, 2 pages.

Altela Treating Water Naturally—Altelarain Solution, 2009, Internet printout, 3 pages.

AltelaRain Produced Water Treatment Technology—Treating Water Naturally, undated, Internet printout, 1 page.

AltelaRain Produced Water Treatment Technology, Nov. 6, 2006, Internet printout, 9 pages.

\* cited by examiner

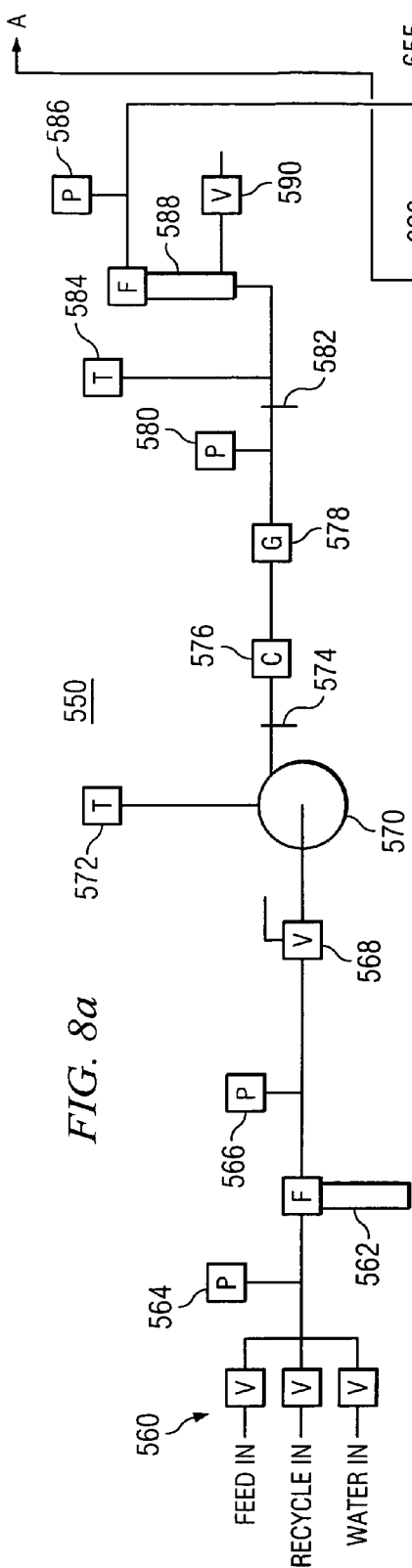
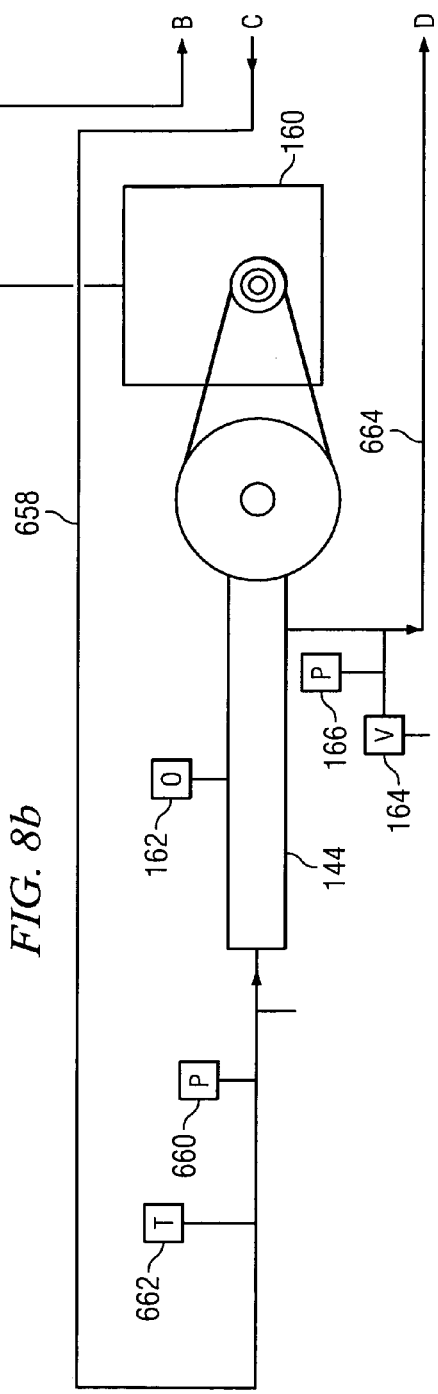
FIG. 8a
FIG. 8b

METHOD AND APPARATUS FOR PURIFYING WATER

RELATED APPLICATIONS

This non-provisional patent application claims the benefit of provisional patent application Ser. No. 60/932,752 filed Jun. 1, 2007. This patent application is also related to non-provisional patent application Ser. No. 12/156,216 filed May 31, 2008, which issued as U.S. Pat. No. 7,693,459 B1 to Raymond C. Sherry, and is entitled "Self-Cleaning High Pressure Nozzle."

TECHNICAL FIELD OF THE INVENTION

The present invention relates in general to water purification techniques, and more particularly to methods and apparatus for purifying production water produced as a byproduct from oil and gas wells.

BACKGROUND OF THE INVENTION

The purification of liquids is often required for various reasons. Processes are available for removing impurities from liquids to separate the same in order to properly dispose of the impurities and utilize the pure liquid. Often this is required because the impurities are toxic and otherwise not suitable for ordinary disposal, but require special treatment and handling. In other situations, the aim is to obtain the pure liquid for subsequent use, irrespective of the manner in which the impurities are disposed of using conventional or non-conventional techniques. In the latter category, the purification of ground water is a prime example where chemical impurities and particulate matter are removed so that a potable form of water is available for use.

The purification of water and other liquids takes many forms, including simply filtering the water to remove particulate matter, treating the water chemically to remove both liquid and particulate impurities, and the processing of water by multi-stage systems that accomplish all of the foregoing, in order to provide a purified form of water. Salt water is routinely processed to remove the salt content and other impurities so as to provide potable water. Waste water from ships, industrial facilities, municipalities and other areas is processed to remove the contaminants so that the resulting water can be reused or disposed of in an environmentally safe manner.

The field of petroleum and gas production is an area where a substantial amount of fresh water is used, and a high percentage of the same is returned in the form of highly contaminated water. Here, millions of gallons of fresh water are injected under high pressure conditions into the well to fracture the ground formation and facilitate the production of petroleum or gas therefrom. The water that is returned to the surface in the well ("production water") during the production of the hydrocarbon resource is liquid in form, and resembles water only in terms of the liquidity thereof. The highly contaminated production water includes many organic and inorganic impurities, has an irritating chemical smell, and is generally brownish in color. The various contaminants resident in the production water include volatile chemicals employed during the fracturing process, calcium, sodium, chlorides, gasses and many other toxic compounds. The production water is not usuable for any other purpose, and thus must be disposed of in a manner that is closely scrutinized. The production water recovered from a well cannot be reused for the production of gas or oil from another well. The five million gallons of fresh water that are injected into a gas well during the fracturing process yield about seventy percent of the same as production water. A gas well can generate production water for many years after it has been opened. Currently, the production water is disposed of by drilling a deep injection well many feet below the ground surface, in an area free of underground water sources, and pumping the production water therein. Many tanker trucks are required to continuously remove the production water from the well site and transport the same to the disposal well. The heavy truck traffic not only places a burden on the roads, which are often rural roads, but also causes highway traffic congestion and other related problems. It can be appreciated that this process is inefficient, costly and environmentally unsafe.

Routine liquid purification techniques include several major technologies, one of which is carbon filtering. Carbon filters are commonly used by passing a stream of water through a bed of carbon material. While this type of filter functions well for its intended purpose, it is adequate for water that is only mildly impure, and is not well adapted for processing huge amounts of water. The inadequacy of a carbon filter is that such a purification process does not remove metals, bacteria and dissolved minerals. Carbon filters are often used in conjunction with other purification processes.

Ion exchange systems are available for removing impurities from water. This type of system employs an ion exchange unit having a bed of beads that is ionically charged so that it attracts impurity ions of an opposite charge. This type of water processing system functions well for home or office use, but requires frequent recharging of the resin bed. This type of system is well adapted for softening water that is already potable.

Reverse osmosis is another process for removing contaminants from water. The reverse osmosis process utilizes one or a series of permeable membranes through which the water is forced. The membranes are constructed with microscopic holes so that generally only water molecules pass through the membrane and other larger molecules, such as chemical and other impurities, are trapped and cannot pass through. However, the reverse osmosis membranes are generally unable to remove all inorganic and organic contaminants. The pressure of the water is significant in order to force the water through the membranes, and generally a substantial area of the reverse osmosis membrane is required. Because of the nature of the process, substantial large-area membranes are required in order to produce a reasonable amount of purified water. A prefiltering system is required in order to remove the larger molecules and particulate matter so that the reverse osmosis membranes do not become clogged in a short period of time. To that end, the cleaning of the reverse osmosis membranes requires frequent attention, and the system must be either shut down, or the contaminated water routed to an alternate off-line reverse osmosis system. Reverse osmosis systems must be very large if required to process a reasonable amount of water per unit of time. In addition, commercial reverse osmosis systems are costly as they tend to be large and require complex subsystems. An example of a reverse osmosis system is described in U.S. Pat. No. 7,306,735.

Distillation systems are well known for removing many types of contaminants from water. The distillation process involves heating the water to a high temperature and then processing the hot water in an environment to flash the water into steam or otherwise vaporize the same. The steam is then condensed to separate the water from the contaminants. These systems are well adapted for removing a high degree of the contaminants, and with the requisite amount of prefiltering, can process a substantial amount of water before the system requires cleaning or disposal of the contaminants. Various distillation systems include U.S. Pat. No. 4,319,964 for the high volume distillation of liquids; U.S. Pat. No. 4,941,330 for a multi-stage flash evaporator; U.S. Pat. No. 5,207,928 for a method for desalination and fresh water recovery; U.S. Pat. No. 6,635,149 for a water purification system, and U.S. Pat. No. 6,740,205 for processing shipboard wastewater.

Many, if not all of the foregoing water purification systems are adapted for purifying a source of water that is not of the toxic type that is produced during the extraction of gas or petroleum from a well. As noted above, the impurity-laden water that is a byproduct of producing gas or oil from a well includes all of the normal contaminants contained in waste water and ground water sources, and many additional contaminants that must be removed in the purification process. In addition, since the production water is produced with a gradually declining volume during production, it is not economical or cost effective to employ a high capacity processing system that meets the initial production water capacity, but is thereafter underutilized. Full utilization of a water processing system can be achieved if centrally located amongst a number of wells, but then the production water must be transported or piped to the processing facility.

From the foregoing, it can be seen that a need exists for an efficient water purification system that can process the impurity-laden production water and produce a purified water output. A need exists for a system that removes contaminants from the production water, or other water source, and is well adapted for removing the collected contaminants as a sludge, to thereby remove the same from the well site in a safe and economical manner. Another need exists for a modular water purification system of the type that can be co-located at the well site with the source of the production water so that no transportation of the production water is necessary. Yet another need exists for a water purification system that is modularized so that after the quantity of production water has subsided, a portion of the system can be removed and transported to another well site and used in parallel with other like systems.

SUMMARY OF THE INVENTION

In accordance with the principles and concepts of the invention, disclosed is a purification system well adapted for processing water having many liquid, particulate and gaseous contaminants, to produce a usable form of water that is environmentally safe.

According to a feature of the invention, the purification system employs thermal energy to heat the water to be purified, and reuses a high degree of the spent energy to preheat the water and otherwise use the energy in the processing system to optimize the efficiency thereof.

According to yet another feature of the invention, a natural gas engine is employed to drive a high pressure pump to pressurize the water that is purified by way of flash evaporization techniques. The thermal energy from the exhaust of the engine is reused as thermal energy in the system, thereby optimizing the efficiency of the system.

According to another feature of the invention, the various components of the water purification system are modularized so that a number of modules can be used in tandem to increase the throughput of the system, and when the volume demands change, various modules can be added or removed from the system to easily satisfy water purification demands.

According to an important feature of the invention, when processing gas or oil well production water, the gasses, oils and particulate matter are first removed by heating the production water to outgas the gasses and volatile vapors, and then separate the oils from the water using a swirling vortex so that the higher density liquids, such as water, remains generally at the periphery and the bottom of mixture, and the lighter density oils remain at the top center of the swirling vortex. An inlet floating at the center of the vortex is adapted for removing the lighter density oils that have been separated from the water.

In accordance with one embodiment of the invention, disclosed is a water purification system for purifying a contaminated liquid. The system includes a burner for heating the contaminated liquid, and a separation container into which the heated contaminated water is pumped and sprayed to volatize vapors contained within the heated contaminated liquid. The separation container is adapted for swirling the heated contaminated liquid to form a vortex and separate liquids of different densities contained within the heated contaminated liquid. Included is apparatus for retrieving low density liquids at the center of the vortex, and apparatus for retrieving high density liquids from a bottom of the separation container.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 8a is an equipment diagram illustrating the input apparatus to which the production liquid is processed and carried to the subsequent system processing equipment;

FIG. 8b illustrates the high pressure pump circuit of another embodiment of the liquid processing system;

FIG. 9 illustrates a multi-stage portion of the liquid processing system in which the high temperature liquid is flashed to produce high purity water as well as liquid and particulate byproducts to be disposed of.

DETAILED DESCRIPTION OF THE INVENTION

Figure 1:
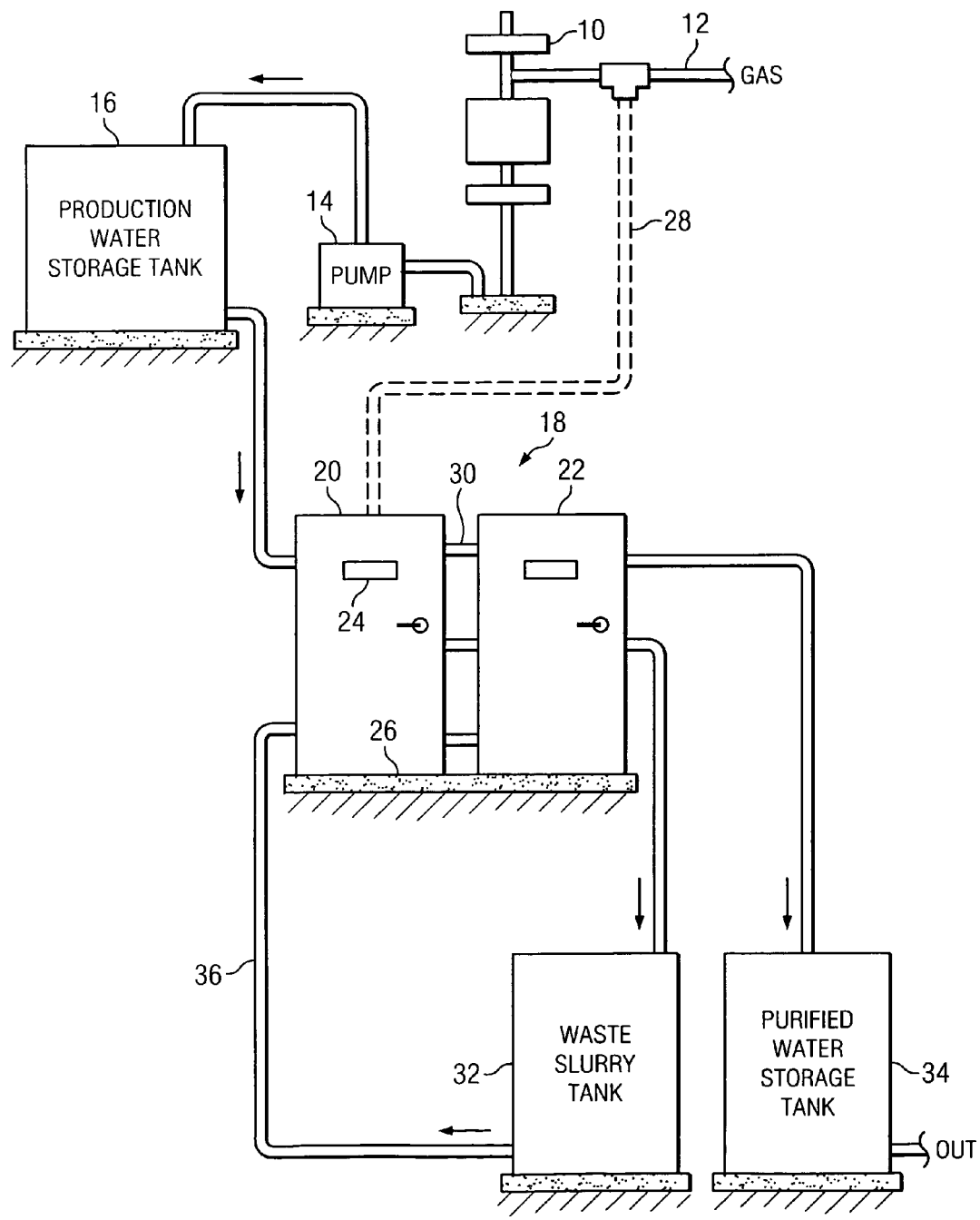
FIG. 1 diagrammatically illustrates a water purification system for a gas well.

With reference to FIG. 1, there is shown an environment in which the principles and concepts of the invention can be advantageously practiced. Shown is a wellhead 10 for a gas well. The gas well produces natural gas at an outlet 12. The conventional equipment, including regulators and pumps for transporting the natural gas are not shown. In addition to the production of natural gas, the gas well also produces a large amount of production water which includes many contaminants, some of which are toxic. Some of the contaminants in the production water may include oil, salts, minerals, heavy metals, etc.

Production water is extracted from the gas well and is often naturally pressurized. In other cases the production water can be pumped with a pump 14 to a large storage tank 16. Since gas wells can initially produce 30-40 gallons of water per minute, the storage tank 16 can have a capacity of about 1,500 gallons. Typically, production water is transported by a large tank truck to a deep well where it is pumped underground. This is not only costly, but presents the hazard of potentially contaminating the underground water supply, as well as the soil.

In accordance with the invention, the production water is processed on site by a water purification system 18. The water purification system 18 is enclosed in one or more enclosures or modules 20 and 22 which are locked to provide security to the purification system 18. By enclosing the components of the purification system 18 in locked modules, tampering, theft and damage by unauthorized persons is minimized. The purification system 18 is preferably processor controlled to provide automatic control and diagnostics for the system 18. To that end, a glass window 24 can be provided to allow a serviceperson to view the state of the purification system and the relevant operating parameters. It is anticipated that the modules 20 and 22 will be about nine feet tall and have a footprint of about four feet by four feet. The modules can be anchored to a concrete pad 26. The modules 20 and 22 can also be fastened together to form a unit. As will be described below, the number of modules and associated water purification components can vary, depending on what is needed at the particular well site. It is anticipated that the modules 20 and 22 will be transported to the well site by flatbed truck, or other suitable means. The needs of the purification system will be determined in advance, and then the particular components will be provided in the modules and transported to the well site. It is further anticipated that if during use of the water purification system 18 a major component fails or requires rebuilding, the entire module will be returned to the factory for refurbishment, and will be immediately replaced with an identical water purification module. This reduces down time of the system 18. However, routine maintenance and replacement of rudimentary parts can take place at the well site. An onboard computer system will be programmed to understand the severity of the failure and inform a central office.

In one embodiment of the invention, the energy required for operation of the water purification system 18 is the natural gas produced at the wellhead 10. The natural gas can be coupled by a pipe 28 to the system 18 and used for generating heat to convert the production water to steam. Alternatively, or in addition thereto, the gas from the wellhead 10 can be used to generate steam to turn a generator to generate electricity for otherwise supplying the electrical requirements of the water purification system 18. As will be described in more detail below, the water purification system 18 includes a high efficiency heater to heat the production water to a very high temperature to create a high percentage of flash steam. The first module 20 may include a low pressure water pump, one or more filters for filtering large particulate matter from the production water, a combined oil separation chamber and heat exchanger, a high pressure pump and an oil/vapor separation unit equipped with a high temperature burner to heat the feed water to a high temperature and at high pressure. The high temperature water can then be coupled by a high pressure/insulated hose 30 to the second module 22. The second module 22 can include an expansion/separation chamber which generates steam, and a condenser for condensing the steam to form purified water. The purified water is pumped to a storage tank 34 for temporary storage. From the storage tank 34 the purified water can be transported to a bottling facility, can be dumped back into a stream or lake, used to irrigate the land, or any other suitable use. The residue not condensed in the condenser/separation unit will result in a slurry which can be pumped to a waste slurry tank 32 for later disposal by tank truck to a disposal facility. As the slurry separates in the tank 32, dense solids will settle to the bottom, leaving the lighter water available for recirculation back to the first module 20 by pipe 36 for reprocessing to further separate the contaminants from the liquid. While not shown, the processing of the production water can result in various volatile gasses which can be separated and otherwise disposed of. It is anticipated that most of the volatile gasses that are flammable can be recirculated to the burner as an auxiliary energy source for heating the production water to a high temperature. In the description which ensues, it will be evident that the efficiency of the water purification system 18 can be enhanced by reusing waste products and the heat and steam to reduce the operational costs of the system 18.

The modular nature of the water purification system lends itself well for tandem use during initial operation of a gas well when the volume of production water is high. Initially, the amount of production water produced by a gas well can be 30 gallons per minute, or more, but will eventually drop to about 3-4 gallons per minute. The water purification system 18 of the invention is adapted for processing about 3-4 gallons of fresh water per minute. The water purification system 18 operates independently and autonomously to process production water and produce pure water for a variety of uses. Thus, multiple water purification systems 18 can be initially connected to the production water supply 16 and simultaneously process large quantities to produce fresh water. As the production water from the gas well decreases over time, one or more of the modular purification systems 18 can be removed from the well site, leaving only the appropriate number of systems 18 to process the volume of production water being produced at that time. To that end, the modular water purification systems 18 are each cost effective so that multiple modular units can operate simultaneously at a single well site to accommodate the production water then produced. The capacity of the overall water purification systems 18 can be reduced simply by removing the requisite number of systems from the parallel connection, and move the excess systems 18 to another well site location. The water purification systems 18 are each cost effective, easily portable because of the modular nature, to thus provide a significant flexibility to adjust to the capacity needs that exist, without having excess water processing capacity that is not used. The modular feature of the water purification allows the modules thereof to be easily connected and disconnected together as well as to the well site facilities, and loaded on a truck bed to be hauled to another site.

FIGS. 2a-2d illustrate the details of a water purification system 40 constructed according to one embodiment of the invention. The system 40 includes one or more programmed processors, one shown as numeral 42, with respective interfaces 44 connected to the various sensors and control components of the system 40 to monitor the functions and control the same without human intervention. The water purification system 40 can be constructed as modules 20 and 22 shown in FIG. 1, and operate autonomously as a system at the well site to process production water and purify the same. Production water, or feed water, is coupled from the production water storage tank 16 through a coarse filter strainer 45 to a main shutoff valve 46. The feed water is then coupled to a pump 48 which pressurizes the feed water to about 40 psi and pumps it to the system 40 for processing. A sacrificial anode 50 is placed in the water line to reduce deterioration of the metal pipes and components. The pressurized feed water is coupled through a check valve 52 and an input pressure gauge 58, through a medium strainer filter 60 and then to an output pressure gauge 62. By monitoring the input pressure and the output pressure of the medium strainer filter 60, it can be determine whether the strainer filter requires cleaning. A backwash liquid can be coupled via valve 61 for backwashing the medium strainer filter 60. The same cleaning process can be employed with the coarse strainer filter 45. The pressure gauges 58 and 62 are the type having electrical monitor interfaces, which are coupled to the processor interface 44. A second sacrificial anode 56 is coupled to the water line to again reduce deterioration of the metal components. A flow gauge 54 measuring gallons per minute is connected to the feed water line to measure the volume of feed water input into the system 40 for processing. Such gauge 54 can be used to determine the processing capability of the system 40 and used as a parameter for charging the customer for usage of the water purification system 40.

Figure 2A:
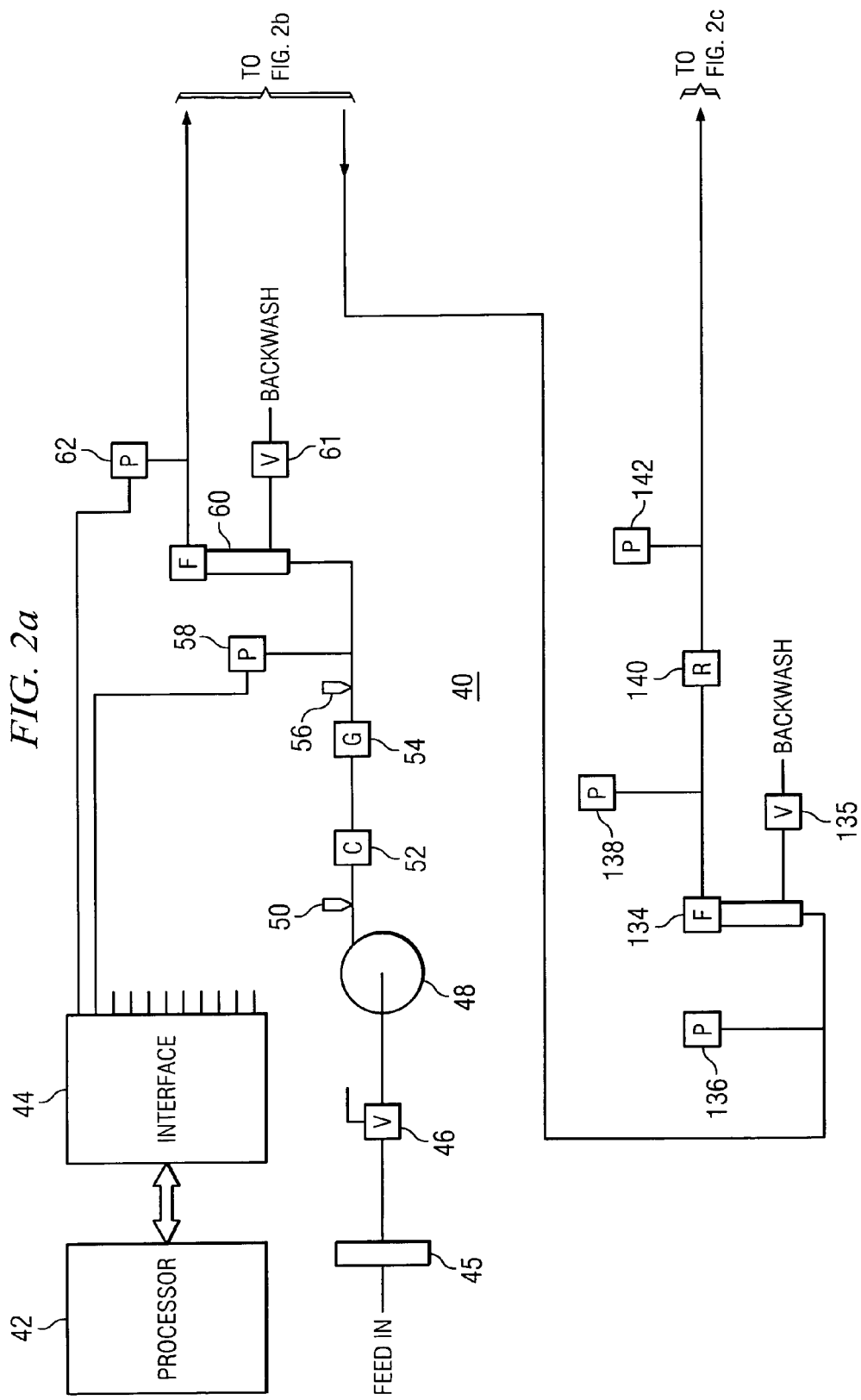
FIGS. 2a-2d illustrate a water purification system according to one embodiment of the invention.
Figure 2B:
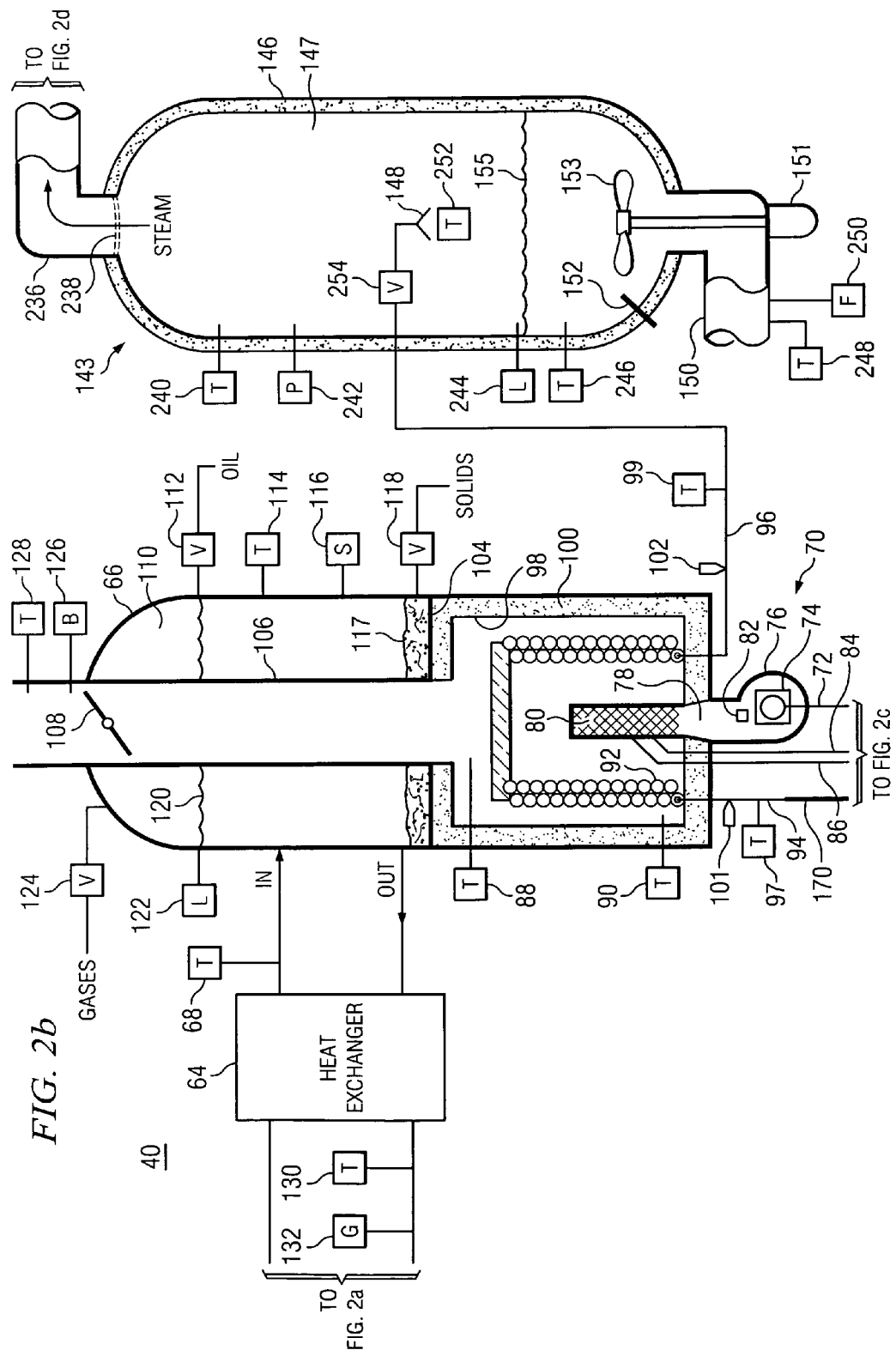

The feed water is then coupled to an oil separation unit 66 shown in FIG. 2b. The feed water first enters a heat exchanger 64 which heats the feed water from the processed high temperature water previously processed by the oil separation unit 66. The heat exchanger 66 is of conventional design. A temperature gauge 68 is provided to monitor or verify the temperature of the feed water entering the oil separation unit 66.

The oil/vapor separation unit 66 is about 4 feet tall and about 20 to 24 inches in diameter, and constructed of low carbon or stainless steel. The bottom half of the oil separation unit 66 houses a high temperature heater or burner 70 fed by natural, propane or other suitable gas. The burner 70 includes a gas input 72 and a venturi 74 where the gas is mixed with air. The venturi 74 is coupled to a 9,000 rpm variable speed combustion blower 76 which forces the combustible mixture through an adapter 78 to a fine mesh flame tube 80. The flame tube 80 is constructed with a mesh closed end. The mesh tube 80 is constructed so that the flame is ignited on the outside thereof to produce up to 1-1.5 million BTU of heat. A pressure sensor or gauge 82 senses the presence of air forced into the burner by the blower 76. The pressure sensor 82 is monitored by the processor 42 so that if the blower 76 is not operating properly, the gas supply to the burner 70 is shut off. The speed of the blower 76 is similarly controlled by the processor 42 to maintain optimum efficiency and heat for heating the feed water. Effectively, the heat produced by the burner 70 is controlled by the speed of the blower 76 and the amount of gas fed to the burner. The processor 42 controls the speed of the blower 76 during start up to verify that the system is starting properly, and to evacuate the burner 70 of gas if the spark did not initially ignite the gas in the proper time period. As will be described more thoroughly below, the volume of gas fed to the burner 70 is controlled by a modulating valve in response to the flow of air through the venturi 74, although the gas flow could also be processor controlled or by other means.

The burner 70 is equipped with a spark conductor 84 and a flame rod 86. The spark conductor 84 carries a high voltage which is coupled to a gap (not shown) to produce a spark, which is controlled by the processor 42. When the spark ignites the gas on the outside of the mesh tube 80, the flame rod 86 senses the presence of a flame and signals the processor 42 of the same. The sequence of operations in starting the burner includes the following. The processor 42 purges the system using the blower 76, verifies gas is available, and charges the burner with the proper air/gas mixture while the blower 76 is turned on at a low rpm. The igniter 174 (FIG. 2c) is activated to create a spark in the presence of the air/gas mixture. The presence of heat in the burner chamber is sensed by the temperature thermocouple 88. The temperature is controlled by the speed of the blower 76, which is controlled by the processor 42. As the speed of the blower 76 is increased, the modulating valve allows more gas to pass therethrough to the burner 70, proportional to the volume of air. In the event that the flame is not sensed at the flame rod, the gas valves are closed and the blower 76 is shut off. The system is then purged of any residual gas by the blower 76 and the start sequence is repeated. If the burner 70 does not ignite after several sequences it is considered defective and the water purification system 40 is shut down. It should be understood that before the burner 70 is ignited, feed water starts flowing through the system 40 so that the system 40 does not become overheated and cause damage to the components thereof, it being realized that the system 40 depends on the absorption of the heat energy by the feed water. Another temperature sensor 90 is provided at the bottom of the burner chamber so that the chamber temperatures can be compared by the processor 42 to determine the operating conditions thereof.

Situated around the burner, and especially the mesh flame tube 80 is a finned helical coil 92 having a high pressure feed water inlet 94 and a high temperature water outlet 96. The helical coil 92 is constructed of heavy gauge stainless steel tubing to withstand the water pressures and temperatures involved and has heavy duty fins therearound to absorb the heat from the burner 70. The helical coil 92 is constructed to withstand a water pressure of about 5,000 psi, but under normal conditions experiences about 3,500 psi. As described below, the pressure of the feed water circulated though the helical coil 92 will be substantially high, between about 3,000 psi and about 3,700 psi. The helical coil 92 has an outer coil wound around an inner coil to provide a double tubing to increase the surface area exposed to the heat energy. The total length of the tubing is predefined which, together with the volume of water passing therethrough, determines a residence time in which the feed water is subjected to the high temperature processing in the burner 70. A first temperature sensor 97 senses the temperature entering the helical coil 92, and a second temperature sensor 99 senses the temperature of the feed water after being heated by the burner assembly 70. It is expected that the temperature of the feed water entering the helical coil 92 will be between 100 and 200 degrees F., and the temperature of the feed water leaving the helical coil 92 will be between 400 and 700 degrees F. An input sacrificial anode 101 and an output sacrificial anode 102 protect the metal components from deterioration. The output anode 102 is preferably constructed of magnesium to withstand the high temperatures involved.

The burner assembly 70, including the helical coil 92, are housed in a steel box 98 that is fixed within the oil separation tank 66. Heavy duty insulation 100 and fire brick are placed between the burner box 98 and the oil separation tank 66 to prevent the loss of the heat energy produced by the burner assembly 70. A major portion of the heat generated by the burner assembly 70 is absorbed by the feed water circulated through the helical coil 92. However, the remainder of the heat generated by the burner assembly 70 passes through the top portion of the oil separation tank 66. The top and bottom portions of the oil separation tank 66 are separated by a divider which encircles a flue stack 106. A processor-controlled damper 108 controls the exit rate of the heat and combustion products of the burner 70 to obtain optimum combustion efficiency and energy transfer of heat to the water. The excess heat energy generated by the burner assembly 70 is used to initially heat the feed water to a temperature of about 287 degrees F. A further efficiency in the use of the thermal energy can be obtained by using the heat that is otherwise vented out of the flue stack 106. The flue stack 106 can be formed in a U-shape to extend downwardly into a separate tank containing a bath of the feed water. The bottom end of the flue stack 106 would be submerged within the feed water. With this arrangement, the hot flue gas heats feed water as the hot exhaust gasses bubble therethrough. The exhaust gasses otherwise vented out the flue stack 106 can also be routed through a tubing that is immersed in the feed water to preheat the same.

Referring back to the input of the feed water to the upper portion of the oil/vapor separation tank 66, it is seen that the feed water coupled to the oil/vapor separation tank 66 enters the upper portion 110 thereof; and surrounds the flue stack 106. The pressure of the feed water is about 40 psi, as determined by the low pressure pump 48. Various sensors are coupled to the upper portion of the oil separation tank 66, including a valve 112 automatically operable to remove oils and the like which rise to a measured level of the feed water in the tank 66. Once the feed water is heated to the desired temperature, other liquids lighter than water will rise to the surface and can be skimmed off by opening the valve 112 and allowing the liquids to be carried to a storage tank (not shown) and disposed of appropriately. A temperature sensor 114 is provided to sense the temperature of the liquid in the oil separation tank 66. A pressure switch 116 senses the pressure of the liquid in the oil separation tank 66, and is processor monitored to control the pump 48 to maintain a specified pressure of about 40 psi within the oil separation tank 66. Due to the temperature of the feed water in the oil separation tank 66, various solids 117 forming a slurry will be generated and settle out to the bottom of the upper portion of the oil separation tank 66. A valve 118 is provided near the bottom the feed water compartment to allow the slurry of solids to be removed from the oil separation tank 66. The slurry 117 can be coupled to the waste slurry tank 32 of FIG. 1.

The feed water compartment 110 in the top portion of the oil separation tank 66 is not completely filled with feed water. Rather, there is a space to allow gasses to be formed in the top portion of the feed water compartment 110. Once the feed water is heated to a temperature above 200 degrees F., at a pressure of about 40 psi, volatile gasses initially trapped in the water will accumulate over the surface of the feed water, above both the oil and steam. The level of the liquid in the feed water compartment is shown by numeral 120. A liquid level sensor 122 senses the level 120 of the liquid in the feed water compartment 110. A processor-controlled valve 124 is provided to allow the volatile gasses to be removed from the top of the feed water compartment 110. Importantly, the feed water is degassed, the oils are separated and removed, as are the solids, in the oil separation tank 66. The first stage of preheating and processing the feed water thus cleans it by removing the noted items, before a second stage of further heating and flashing into steam.

It is important to appreciate the control of the various parameters, such as pressure and temperature of the feed water that is maintained in the feed water compartment 110. By maintaining the parameters under close control, the feed water can be processed reliably with predictable results. The level 120 of the liquid in the feed water compartment 110 is important, as if the liquid level 120 raises too much due to pumping too much feed water therein, the pressure in the feed water compartment 110 will increase. If the liquid level 120 falls too much, then the pump 48 will pump a higher rate of feed water into the oil separation tank 66 to raise the liquid level 120. However, in doing so, the valve 124 will be momentarily opened to allow enough gas to escape so that with the liquid level 120 restored, the pressure of the gas in the top of the feed water compartment 110 is also restored to the desired pressure. The desired pressure is first maintained, and thereafter the desired liquid level is restored. Preferably, it is expected that the pump 48 will pump the feed water to the oil separation tank 66 at an average rate of about two to nine gallons per minute, depending on the flow rate at the pump required to maintain a balanced temperature/pressure to the heating coil 92. The amount of water that is subsequently converted to steam at flash point is a result of the heat added in the helical coil 92 and the expansion chamber environment. As noted above, the gas bled off through the valve 124 can be coupled to the burner 70 to assist in combustion to produce heat. Optionally, a steam trap (not shown) could be used in the gas line to the valve 124 to prevent steam or water vapor from being coupled to the burner 70 with the vapor gasses.

As noted above, the damper 108 is controlled to maintain heat in the flue stack 106, but not choke off the flow of combustion gases so that the burner is starved of oxygen. The position of the damper 108 is controlled by the processor 42, based on the readings of an oxygen sensor 126, a $CO_2$ sensor (not shown), and a temperature sensor 128 located in the top of the flue stack 106, above or below the damper 108.

Once the feed water has been preheated and processed to remove volatile gases, oils and particulate matter, it exits at the lower end of the feed water compartment at a temperature of about 200 degrees F. The preheated feed water passes through the heat exchanger 64 to preheat the incoming feed water, thus increasing the efficiency of the system, and lowering the temperature below about 140 F, or less, before the water enters the high pressure pump 144. The feed water temperature can be measured before it enters the oil separation tank 66 by way of temperature sensor 68, and after the preheated feed water has exited the oil separation tank 66 and the heat exchanger 64, by temperature sensor 130. The difference in temperatures is an indication of the energy that has been expended, as a function of the volume of feed water processed. This is a parameter indicating the efficiency of the system 40. Stated another way, the change in temperature ($\Delta T$) of the feed water and the rate of feed water processed should correspond closely to the number of BTU's used in the process. A flow rate sensor 132 measures the gallons per minute of feed water processed and exiting the oil separation tank 66. The measure of the rate of feed water processed, as measured by the sensor 132 could also be used as a "meter" to record the amount of feed water processed in the water purification system 40, and against which a charge could be assessed to the owner of the gas well 10 for use of the water purification system 40.

As illustrated in FIG. 2a, the preheated feed water is then transported in the system through a fine strainer filter 134 to remove fine particulate matter. An input pressure sensor 136 and an output pressure sensor 138 are provided to yield a difference in the pressure across the fine strainer filter 134, and determine if cleaning thereof is required. If cleaning is required, a backwash liquid is coupled to the fine strainer filter 134 via a valve 135 to remove the accumulation of particulate matter. The input pressure sensor 136 can also be used to detect if gasses have been bled from the feed water compartment 110 via valve 124, as once any gas is bled from the feed water compartment 110, the pressure therein decreases.

Figure 2C:
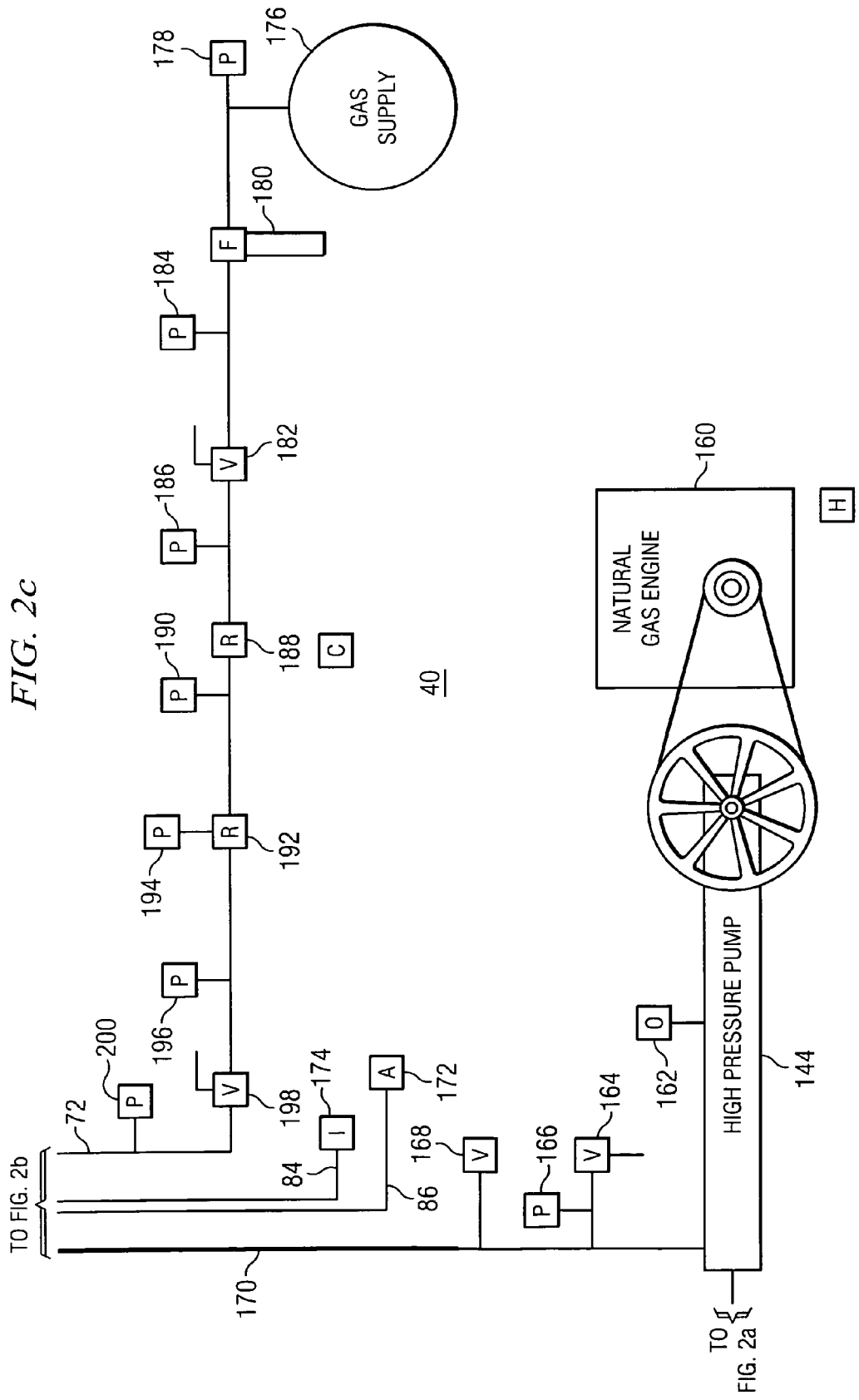
Figure 2D:
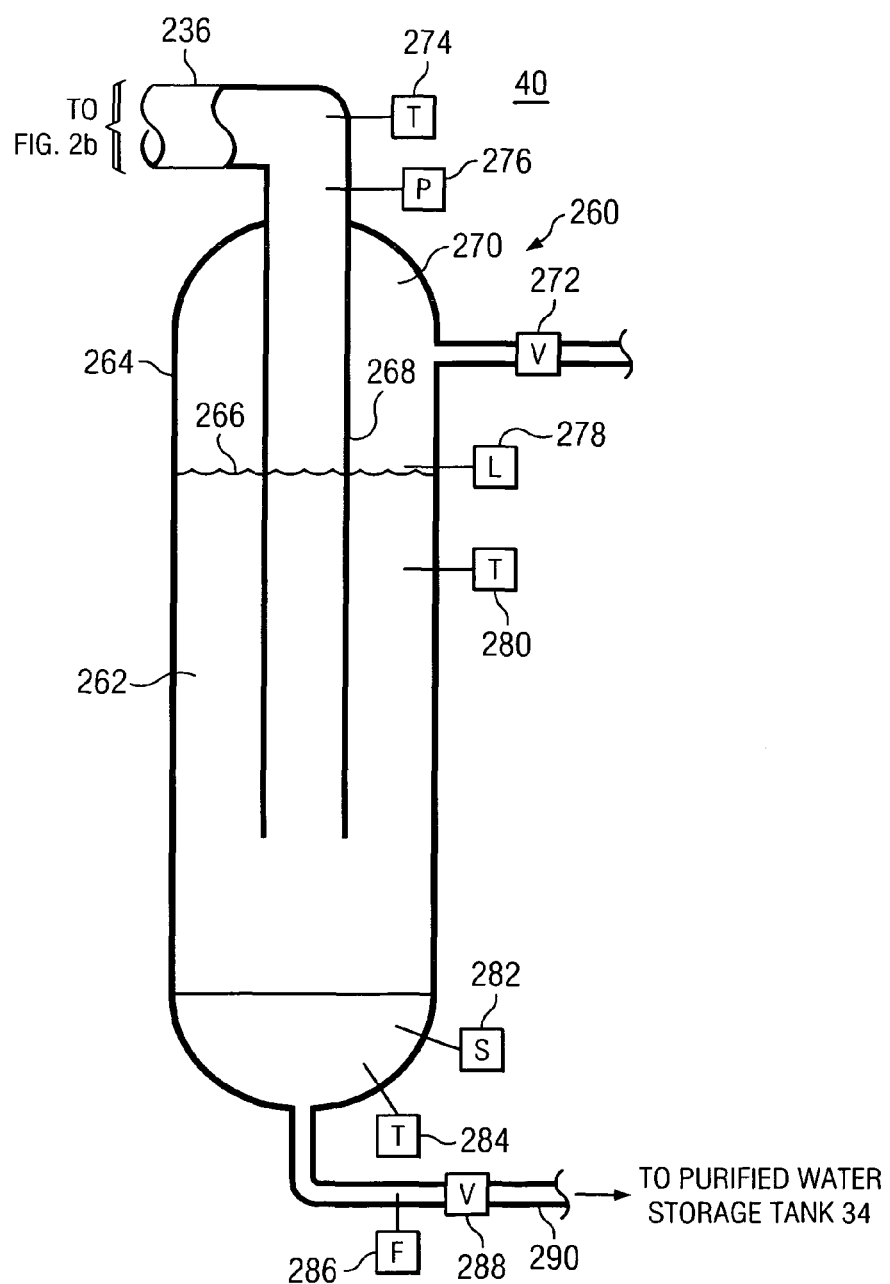

A regulator 140 is provided to regulate the pressure of the preheated feed water down from about 40 psi to about 20-30 psi for input to a high pressure pump 144, shown in FIG. 2c. A pressure gauge 142 is provided to monitor the input pressure of the preheated feed water applied to the high pressure pump 144. A 1.5 inch pipe feeds preheated feed water to the high pressure pump 144, and a 0.75 inch outlet pipe carries high pressure water to the helical coils 92 located in the bottom portion of the oil separation tank 66. After the preheated water has passed through the heat exchanger 64 from the oil separation tank 66, the temperature thereof is lower than about 140 degrees F. before entering the high pressure pump 144. The high pressure pump 144 is a 3-cylinder plunger-type pump capable of pumping water to a maximum pressure of about 5,000 psi, at a rate of about 9 gallons per minute. The preheated water is pressurized by the high pressure pump 144 so that the water does not flash while being heated to a high temperature in the helical coils 92.

The high pressure pump 144 preferably pumps the preheated feed water to a pressure of about 3,500 psi and forces the same through the helical coils 92. As noted above, the burner 70 produces between 1.0 and 1.5 million BTUs of energy to quickly heat the feed water in the helical coils 92 to a temperature between 400-700 degrees F. It is expected that the residence time of the feed water through the helical coils 92 will be between about 5 and 30 seconds, depending on the flow rate. It is well understood by those skilled in the art that the flash point of water is elevated by increasing the pressure of the water. Thus, the high pressure of the preheated feed water in the helical coils 92 prevents flashing of the feed water to steam in the helical coils 92. The high pressure pump 144 is also desired in order to provide high pressure water under high temperature conditions to a flash nozzle 148 (FIG. 2b) so that the heated water efficiently flashes into steam. As will be described below, the flash or expansion nozzle 148 of the invention operates with a constant water pressure of about 3,500 psi.

With reference to FIG. 2c, there is shown the high pressure pump 144. The high pressure pump 144 is driven by a reciprocating natural gas powered engine 160. The engine 160 is adapted to burn the natural gas extracted from the gas well. The high pressure pump 144 is driven by the engine 160 at about 400-800 rpm. An oiler 162 is provided to enable the high pressure pump to be oiled, as needed. A relief valve 164 is coupled to the outlet of the high pressure pump 144 to provide pressure relief in the event that the output pressure of the pump 144 exceeds a specified amount. A valve 168 is controlled by the processor 42 to open during start-up of the high pressure pump 144. This allows the output pressure of the pump 144 to be reduced during starting thereof and facilitate full speed operation without stressing the pump 144. A pressure gauge 166 allows an operator or service person to visually determine the output operating pressure of the high pressure pump 144. The high pressure water is coupled from the pump 144 to the helical coil 92 in the oil separation tank 66 by a flexible high pressure hose 170 to aid in damping pressure surges. As noted above, the flame rod senses the presence of a flame around the mesh flame tube 80. The flame rod is connected to a conductor 86 which is connected to a sensor 172 that senses the current in the conductor 86 indicating the presence of a flame. The processor 42 is programmed to otherwise control the burner 70 should the gas fail to ignite and heat the flame rod. Lastly, the igniter of the burner 70 is connected to a high voltage wire 84. The high voltage wire 84 is connected to a conventional spark generator 174 controlled by the processor 42.

The fuel used by the burner 70 is controlled by the processor 42. FIG. 2c illustrates the various components employed in feeding the burner with fuel. In the preferred embodiment, either propane, or a source of natural gas 176 is employed, and most preferably natural gas as it is readily available at a gas well site. The use of natural gas from the well may require a contaminant removal system, not shown. A propane tank can be provided as a source of gas for the burner 70. In any event, there is a pressure gauge/sensor 178 for sensing the pressure of the gas exiting the gas source 176. The pressure of the gas source 176 is considered to be less than 10 psi. A particulate filter 180 is placed in line to filter out any particulate matter carried by the gas. A shut-off valve 182 is provided for shutting down the supply of gas to the burner 70. An input pressure gauge/sensor 184 and an output pressure gauge/sensor 186 are monitored by the processor 42 to verify the state of the gas shut off valve 182. A regulator 188 is provided to reduce the pressure of the gas from a maximum of about 10 psi to about 0.5 psi. Again, a processor-monitored pressure gauge/sensor 190 is provided to verify that the regulator 188 is operating properly.

As noted above, the gas is fed to the burner 70 by way of a modulating valve 192. An associated pressure gauge/sensor 194 is employed to monitor the operation of the modulating valve 192. As noted above, the modulating valve 192 is not computer controlled, but rather is modulated as a function of the air flow in the burner 70 at the venturi 74. As the air flow in the venturi 74 increases, the modulating valve opens to allow more gas to the burner 70, and vice versa. A manually-operated valve 198 is placed in line with the gas line to the burner 70. Input and output pressure gauge/sensors 196 and 200 are employed to allow the processor 42 to monitor the proper operation and state of the manual valve 198. From the manual shut-off valve 198, the gas is fed to the burner 70.

Referring back to FIG. 2b, the hot pressurized water exits the helical coils 92 and is carried to an expansion tank 143. The expansion tank 143 is constructed of steel and is about 20-36 inches in diameter and about 8 feet tall. An insulation 146 covers the outer surface of the expansion tank 143 to prevent condensation of the steam inside the tank 143. The high pressure hot water is coupled to an expansion nozzle 148 located in the lower portion of a flash chamber 147. The nozzle 148 is preferably oriented downwardly to eject the hot, pressurized water downwardly so that it flashes into steam near the bottom of the flash chamber 147. In particular, the temperature of the flash chamber is expected to be about 212 degrees F., and the water applied to the expansion nozzle 148 is expected to be about 400-700 degrees F. With a hot water pressure of about 3,000 psi, about thirty to seventy percent of the hot water flashes into steam respectively. The pressure conditions in the expansion tank 143 are preferably atmospheric, if no downstream steam requirements are needed. Depending on the conditions involved in the expansion tank 143, including the parameters of the latent heat of steam, the pressure and temperature of the water and the pressure in the expansion tank 143, not all of the hot water will flash into steam. Rather, some of the hot water will remain in the liquid form and will fall to the bottom of the expansion tank 143. The nozzle 148 is designed to cause the hot water to be sprayed to form small droplets to increase the surface area exposed to the atmospheric conditions in the expansion tank 143, thus reducing the required size of the expansion tank 143. The hot water, being previously degassed in the feed water compartment 110, contains minimal entrapped gasses and thus the spray of hot water from the nozzle 148 will not only cause a large portion thereof to be converted to steam, but also will cause crystallization of any residual solids carried in the hot water. For example, sodium can combine with chlorides and form crystals of salt which will be blasted to the bottom of the expansion tank 143.

The water not converted to steam and any solids or particulate matter form a slurry 155 at the bottom of the expansion tank 143. The slurry 155 is removed from the bottom of the expansion tank 143 and via a bottom outlet 150, to the slurry tank 32 of FIG. 1. A motor 151 rotates a mixer 153 to constantly agitate the slurry 155 in the bottom of the expansion tank 143. From the slurry tank 32, the mixture can be reprocessed through the water purification system 40 to remove a further portion of the water therefrom. A magnesium anode 152 located in the bottom of the expansion tank 143 assures that the metal components of the expansion tank 143 do not deteriorate over time due to the extreme operating conditions and the presence of chlorides.

Figure 3:
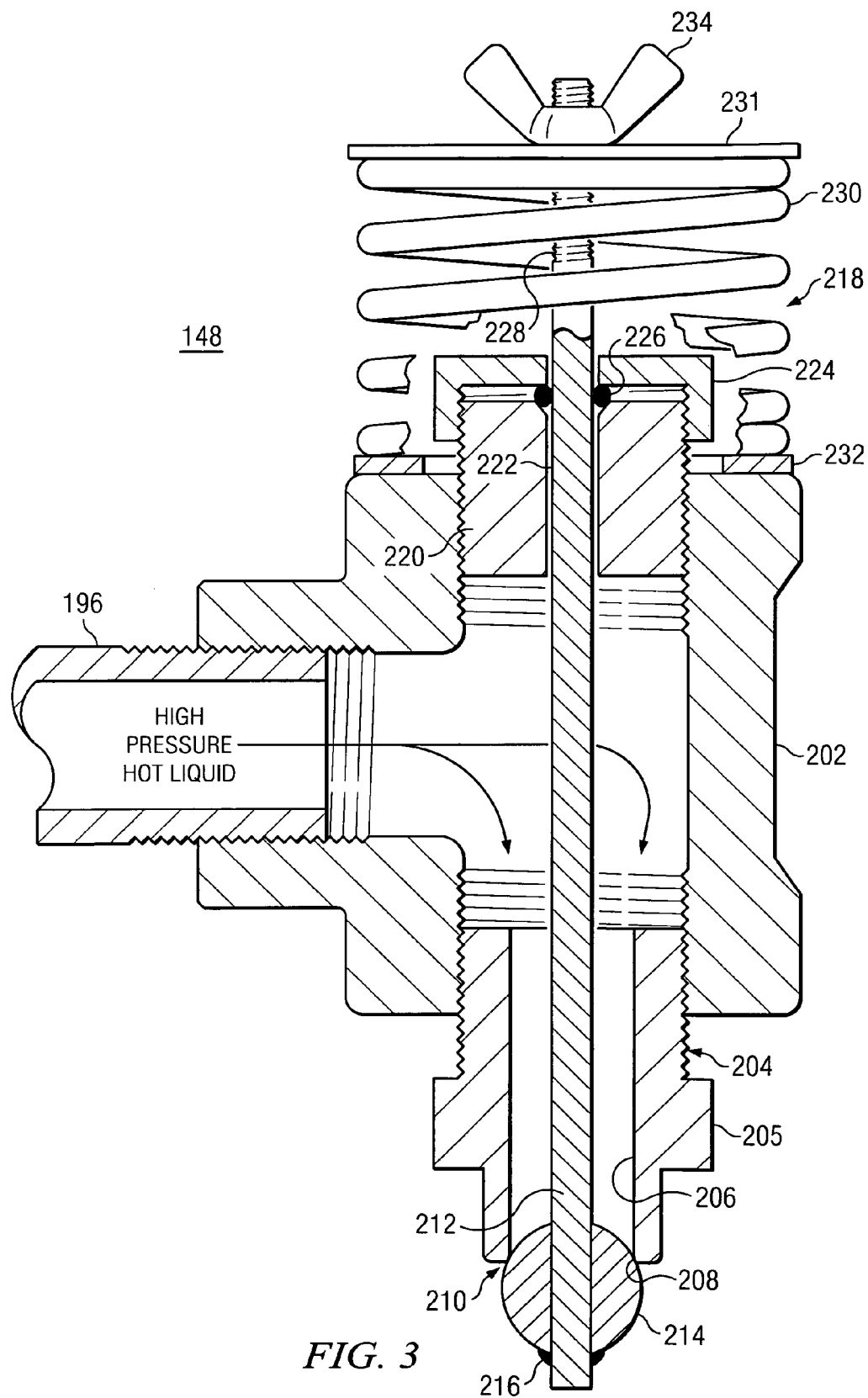
FIG. 3 is a cross-sectional view of an expansion nozzle employed with the water purification system of invention.

FIG. 3 is another embodiment of an expansion nozzle 148 used with the water purification system 18 of the invention. The nozzle 148 is well adapted for operating under isobaric conditions. The stainless steel tube 196 carries high pressure, high temperature production water to the expansion nozzle 148. The tube 196 is threaded into a stainless steel "T" 202 of conventional design. The nozzle apparatus is situated at the bottom of the T 202, and the adjustment apparatus is situated at the top of the T 202. The nozzle apparatus includes a fitting 204 that is threaded into the bottom opening of the T 202. The threaded fitting 204 is typically a stainless steel fitting welded to a stainless steel pipe to mate the pipe to a threaded hole. The fitting 204 is formed with a hex-shaped wrench collar 205. The fitting 204 includes a bore 206 therethrough that opens to an annular edge or seat 208 that forms an annular orifice 210. The annular edge 208 can be chamfered or beveled, if desired.

The expansion nozzle 148 includes a stem 212 to which is welded a ceramic ball 214. The weld is shown as numeral 216. The ceramic ball 214 is larger than the bore 206 of the fitting 204 and thus circumferentially engages with the annular edge 208 of the fitting 204. When the stem 212 moves downwardly, the ceramic ball 214 moves downwardly in a corresponding manner and forms a space or orifice 210 with the annular edge 208 of the fitting 204. The ceramic material of the ball 214 is well adapted for use in the high temperature and high pressure conditions noted above. In practice, the ceramic ball 214 has a bore therethrough through which the end of the stem 212 extends. The lower end of the ceramic ball 214 can thus be welded to the stub end of the stem 212.

The stem 212, and thus the ceramic ball 214, are adjustable by way of an adjustment mechanism 218. The adjustment mechanism 218 includes a stainless steel plug 220 that is threaded into the top of the T 202. The plug 220 is formed with a bore 222 centrally therein and through which the stem 212 extends. An apertured cap 224 is threaded onto the top end of the plug 220. The aperture in the cap 224 allows the stem 212 to extend therethrough. A seal is formed between the plug 220 and the stem 212 using a suitable packing 226 which is squeezed tightly around the stem 212. The packing 226 is squeezed to form the seal by means of the cap 224 being screwed onto the plug 220 sufficiently tight so that the packing 226 forms a seal to prevent the pressurized production water from escaping from the expansion nozzle 148, except through the orifice 210 at the lower end of the nozzle 148.

The top end of the stem 212 has threads 228. A compression spring 230 is captured between a top washer 231 and a bottom washer 232. A thumb screw 234 is threaded onto the top of the stem 212 and rotated to adjust the compression of the spring 230 and thereby apply a preset compression to the spring 230. The constant force produced by the compression of the spring 230 is effective to maintain a constant production water pressure. During static conditions, the upward force on the stem 212 holds the ceramic ball 214 engaged against the annular edge 208 of the fitting 204. In the static condition of the expansion nozzle 148, the orifice area is effectively zero, as the ceramic ball 214 is held against the annular edge 208 of the fitting 204. The spring 230 is constructed of an alloyed steel material to withstand the high temperatures to which the expansion nozzle 148 is subjected. Preferably, the spring 230 is selected to exhibit a linear force over the normal range of compression to provide the desired range of orifice sizes. The preset compression force applied by the spring 230 to the stem 212 can be adjusted to different values by the thumb screw 234.

In operation, the high temperature, high pressure production water is applied to the nozzle 148 by the tubing 196. The pressure of the hot production water, in the neighborhood of 3,500 psi in one embodiment, is sufficient to overcome the force of the spring 230, whereby the stem 212 is forced downwardly against the force of the spring 230. This movement of the stem 212, and thus the ceramic ball 214, is effective to move the ball 214 away from the annular edge 208 of the fitting 204 to thereby form an annular orifice 210. The ceramic ball 214 is moved away from the annular edge 208 of the fitting 204 by a distance such that the force exerted internally in the expansion nozzle 148 by the pressurized production water is equal to the upward force exerted by the spring 230 on the stem 212 and ceramic ball 214. This equilibrium is maintained as long as the pressure of the production water remains the same, which is desired in the preferred embodiment of the invention. As noted above, the steam conversion rate is a function of the heat added to the water in the helical coil 92, and not the temperature/flow rate of the water.

As noted above, the size of the orifice 210 can be manually adjusted by adjustment of the thumbscrew 234. By tightening the thumb screw 234 on the threaded end of the stem 212, the orifice 210 is made smaller, and the pressure of the production water increases to maintain the same flow rate of liquid through the nozzle 148. In contrast, when the thumb screw 234 is loosened on the stem 212, the orifice 210 is effectively made larger, which reduces the system pressure to maintain the same flow rate of liquid through the expansion valve 148. In practice, the size of the orifice 210 is adjusted to provide a desired liquid pressure in the system 18 so that flashing of the liquid in the heating coils 92 is prevented. This condition also achieves optimum flashing of the hot production water into steam. In the embodiment of FIG. 3, the entire expansion valve 148 is inside the expansion chamber 143 and thus the adjustment thereof cannot be accomplished during dynamic operation of the system. According to an important feature, the expansion nozzle 148 is self cleaning, in that any particle or other matter that becomes lodged in the orifice 210 effectively reduces the area of the orifice 210 and thereby increases the pressure within the expansion nozzle 148. This operation of the nozzle 148 is also achieved when the orifice areas accumulate residue thereon, or when the orifice surfaces become worn due to extended use. In response to a reduced orifice area, the increased liquid pressure forces the stem 212 downwardly somewhat to again equalize the forces between the internal liquid pressure within the expansion nozzle 148 and the force exerted by the spring 230. The downward movement of the stem 212 increases the orifice size which may be sufficient to allow the particle to pass through the orifice 210. In this event, the stem 212 will move upwardly until the noted forces again reach equilibrium. If the operation of the water purification system indicates that the particle clogging the orifice is not removed automatically in the manner noted, then it is possible to increase the pressure of the production water upwardly to 5,000 psi to break the particle and force the pieces of the particle through the orifice 210. It should be understood that the operation of the water purification system 18 does not require the use of the expansion nozzle 148 described herein. Other well-known expansion nozzles can be employed.

With reference back to FIG. 2b, the steam converted from the hot water rises to the top of the expansion tank 143, and is carried by an insulated pipe 236 to condenser 260 located in the same module as the expansion tank 143. It is noted that in addition to the generation of steam during the flashing operation in the flash chamber 147, other volatile materials in the feed water not previously removed can form vapors which also pass out of the top of the expansion tank 143. The steam and any volatile vapors first pass through a demisting mesh 238 located at the top outlet port of the expansion tank 143.

In order to automatically control the process of converting hot water to steam in the expansion tank 143, numerous monitor sensors are employed and connected to the processor interface 44. A temperature sensor 240 and a pressure sensor 242 measure the respective temperature and pressure parameters inside the flash chamber 147 of the expansion tank 143. A liquid level sensor 244 senses when the level of the slurry 155 rises above a specified level in the bottom of the expansion tank 143. A temperature sensor 246 measures the temperature of the slurry mixture 155. A temperature sensor 248 measures the temperature of the slurry pumped out of the bottom of the expansion tank 143, and a flow sensor 250 measures the flow rate of the slurry 155 removed from the expansion tank 143. A temperature sensor 252 is located inside the flash chamber 147 adjacent the nozzle 148 to determine the temperature at that location. An electrically-controlled valve 254 functions to connect and disconnect the flow of high pressure hot water to the expansion nozzle 148 to provide for low pressure pump starts and emergency pressure release if the normal pressure relief valve fails to open.

The steam generated in the expansion tank 143 is carried by the insulated pipe 236 to a condenser system 260 (FIG. 2d) for condensing the steam to purified water. In the preferred embodiment, the condenser system 260 comprises a tank 264 about 20-24 inches in diameter, and about 4-8 feet tall. The condenser system 260 is a highly effective bubble type, in which the bottom portion is filled with distilled water 262 which reacts with the steam to convert the steam to more distilled water. When the 212 degrees F. steam contacts water at a lower temperature, the steam condenses and changes phase to the liquid water form.

The pipe 236 carrying the hot steam extends into the condenser tank 264, as shown, below the level 266 of the water. A phase change is a rudimentary process in which the steam either contacts the water within the tube 268, or condenses on the inner surface of the tube 268 which is cooler than the temperature of the steam. In any event, the condensed water is pure and collects within the bottom of the condenser tank 264. Although the water is pure, there may exist uncondensed vapors in the air space 270 at the top of the condenser tank 264. A valve 272 is controlled by the processor 42 to allow the vapors to be vented, and if volatile, coupled back to the burner 70 to be combusted with the natural gas fuel, which is the primary source of fuel for the burner 70.

A temperature sensor 274 and a pressure sensor 276 are mounted to the inlet pipe 236 to monitor the respective parameters of the steam entering the condenser system 260. A liquid level sensor 278 allows the processor 42 to monitor the level of the pure water in the bottom of the condenser tank 264, and adjust the same to achieve a desired level. Pure water is removed from the condenser tank 264 by way of an electrically controlled valve 288 so as to be carried by outlet pipe 290. A temperature sensor 280 monitors the temperature of the water just below the surface level 266. At the bottom of the condenser tank 264 there is a salinity monitor 282 to monitor the salt content of the water, if any, within the condenser tank 264. A temperature sensor 284 monitors the temperature of the water at the bottom of the condenser tank 264. When pure water is removed from the condenser system 260, a flow meter 286 is provided to measure the volume of water removed therefrom.

The fresh water removed from the condenser tank 264 can be pumped to the purified water storage tank 34 of FIG. 1. In addition thereto, the fresh water can be coupled to other parts of the water purification system 40 for other uses. For example, the fresh water can be used in a flue scrubber of the burner 70 to remove contaminants from the exhaust gasses. The fresh water generated by the condenser system 260 can also be used to flush the water purification system 40 to remove deposits and salts therefrom. An additive can be added to the recirculated fresh water to further enhance the cleaning ability of the fresh water when flushed through the system 40. In the event that the system is not to be used for a period of time, an anti-corrosion agent can be added to the recirculated fresh water to prevent deterioration of the system while sitting idle.

Figure 4:
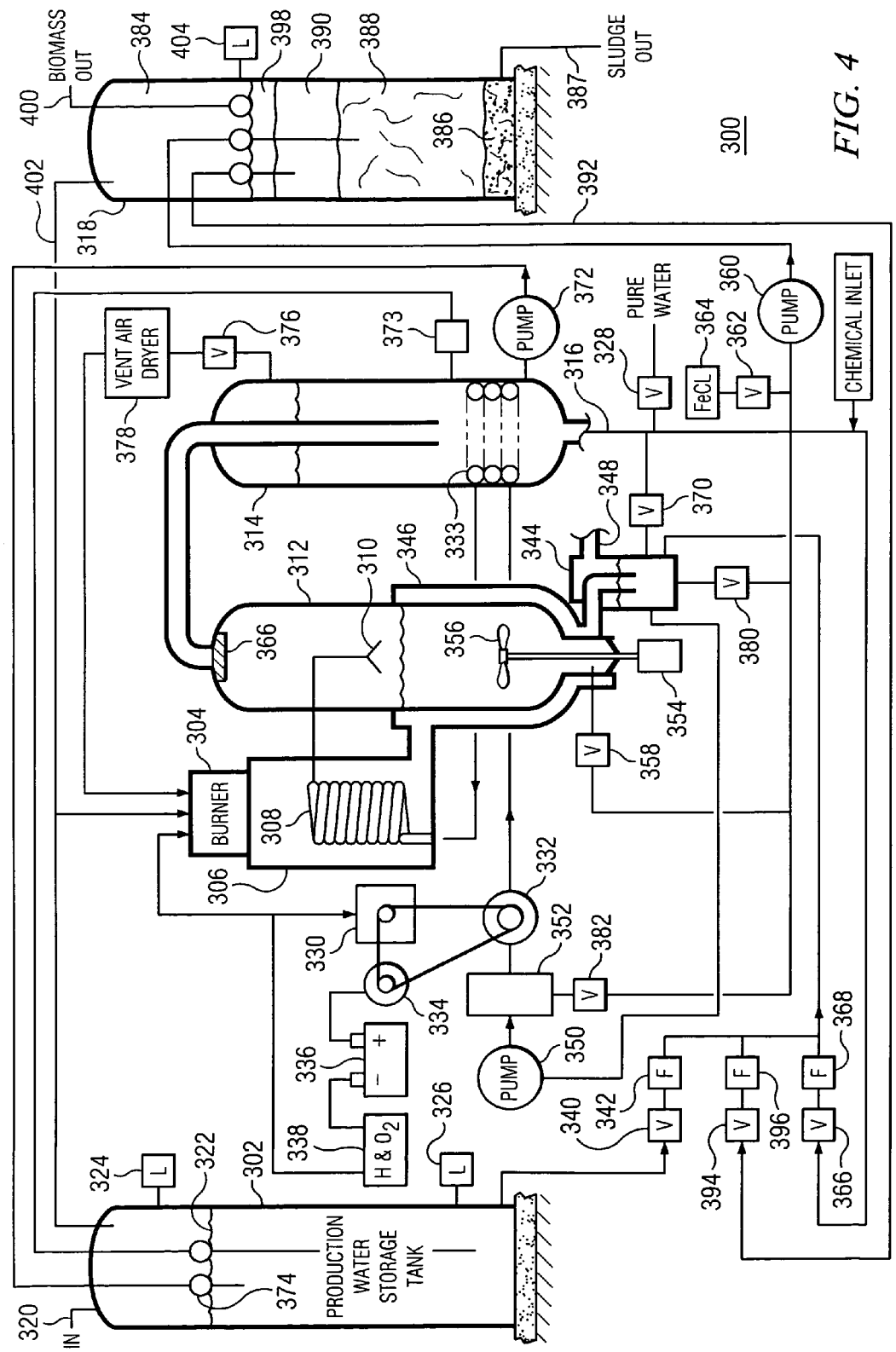
FIG. 4 is a drawing of a water purification system according to another embodiment of the invention.

FIG. 4 illustrates a water purification system 300 constructed according to another embodiment of the invention. This embodiment 300 processes feed water under low pressure conditions, as compared to the high pressures involved in the embodiment 40 illustrated in FIGS. 2a-2d. Shown in FIG. 4 is a tank 302 for holding production water obtained from a well. This system employs a natural gas burner 304 and a combustion chamber 306 that houses a helical coil 308. The heated water from the helical coil 308 is coupled to an expansion nozzle 310 that generates steam within an expansion tank 312. From the expansion tank 312, the steam proceeds to a bubble condenser 314 where it changes phase into condensed water. The output 316 of the bubble condenser 314 comprises purified water.

In this embodiment, the water purification system 300 includes a media separation tank 318. As will be appreciated, the media separation tank 318 can be employed with the embodiment shown in FIGS. 2a-2d. Indeed, many of the features of the water purification system 300 of FIG. 4 can be employed in the FIG. 2a-2d embodiment, and vice versa.

Production water provided from the well site separator tank is coupled to the production water tank 302 via feed water inlet 320. The feed water level 322 is sensed by a high level sensor 324 and a low level sensor 326. A programmed processor, interface and other circuits (not shown) are provided to monitor the sensors and detectors connected to the system components, and control the various functions of the system 300. Once processed, the production water is converted to pure (e.g. distilled) water and output from the condenser 314 via an electrically operated valve 328.

Provided is a gas engine 330 which drives a pump 332 and an electrical generator 334 for generating the electrical power for the system 300. Not shown are the various circuits for converting the AC power generated by the generator 334 to DC current of the appropriate voltages. One of the voltages generated maintains a bank of batteries 336. The power from the DC batteries 336 is coupled to an electrolysis system 338 that uses water and electricity as inputs, and separates the water into the hydrogen and oxygen constituents and feeds the hydrogen and oxygen to the gas engine 330 to operate the same. The hydrogen and oxygen gases are also coupled from the electrolysis system 338, and to the burner 304 as the source of fuel for combustion to produce thermal energy to heat the feed water.

Feed water from the production water tank 302 is coupled to a valve 340 controlled by the processor. When driven to an open state, the valve 340 allows feed water to pass through a flow meter 342 to a flue gas scrubber 344. Flue gas from the burner 304 is coupled to the combustion chamber 306 where it heats water in the helical coil 308. From the combustion chamber 306 the flue gas is forced to the top of a jacket 346 which surrounds the bottom portion of the flash chamber 312. The flue gas enters the top of the jacket 346 and exits the bottom of the jacket 346 into the flue gas scrubber 344. The thermal energy from the flue gas flowing through the jacket 346 is thus used to heat the unflashed water which is in the bottom of the flash chamber tank 312. After various contaminants are removed from the flue gas in the scrubber 344, the resulting gases are vented via the outlet 348. As noted above, the feed water circulates through the bottom part of the scrubber 344, into which the flue gasses are expelled. As a result, the feed water is also preheated in the scrubber 344. From the scrubber 344, the feed water is pulled by a pump 350 and pumped through a filter 352. The pump 350 operates at about 10 gpm and 60 psi. The filtered feed water is pumped by pump 332 to a coil tubing 333 located within the bubble condenser 314. The feed water circulated through the coiled tubing 333 is lower than about 140 degrees F., and thus cools the water in the bottom of the bubble condenser 314 to maintain the same below about 212 degrees F. The pump 332 operates at about 5.5 gpm at a pressure of about 100 psi. The control of the pump 332 is by way of an electric clutch (not shown). The feed water circulates through the coiled tubing 333 and is further preheated therein. From the coiled tubing 333 in the bubble condenser 314, the feed water is pumped into the helical coils 308 located in the combustion chamber 306. The feed water is further heated to a temperature of about 600-650 degrees F. The high temperature feed water is pumped at a high volume through the helical coils 308 to prevent flashing therein. The 600-650 degrees F. feed water is then coupled to the flash chamber tank 312 to the expansion nozzle 310 where the high temperature feed water flashes into steam in the 212-250 degree F. environment of the flash chamber tank 312. The steam rises to the top of the flash chamber tank 312, and the particulate matter and feed water not converted to steam fall to the bottom of the flash chamber tank 312. During flashing of the high temperature feed water, other elements such as solids, particulate matter, ions such as sodium, calcium, chlorine, magnesium, etc., are converted to the crystalline form and fall to the bottom of the flash chamber tank 312 and form a slurry.

A slurry motor 354 turns a mixer 356 to create a slurry vortex in the bottom of the flash chamber tank 312. When a level sensor senses that the slurry has risen above a predetermined level in the flash chamber tank 312, the processor opens a valve 358 to allow a slurry pump 360 to pump the slurry to the slurry tank 318. If desired, the processor can operate valve 362 to allow a source of FeCl to be added to the slurry before being pumped to the slurry tank 318, the structure and function of which will be described below. The FeCl reacts with the particulate matter in solution form to accumulate together into chunks or globs and fall to the bottom of the slurry tank 318.

The steam generated in the flash chamber tank 312 rises and passes through a demisting mesh 366 to the bubble condenser 314. The steam is coupled to the lower portion of the bubble condenser 314 via the vertical tube where it returns to the liquid phase as pure water. Pure, fresh, distilled water is made available from the bubble condenser 314 by way of valve 328. Fresh water can also be coupled through valve 366 to the flue gas scrubber 344. An associated flow meter 368 can measure the volume of fresh water coupled to the scrubber 344. Valve 370 operates to accomplish a similar function. Fresh water can be obtained from the bubble condenser 314 and pumped by pump 372 back to the production water tank 302. This feature allows the fresh water to be reprocessed by the system 300 in the event that the fresh water holding tank (not shown) is full. This effectively delays the time in which the fresh water needs to be removed from the fresh water holding tank. The item 374 in the production water tank 302 is a liquid level sensor. In addition, in the event that sensors sense that the water in the bubble condenser 314 is not of the desired quality, i.e., high salinity, etc., the water can be returned to the production water tank 302 for reprocessing by way of either pump 372 or by operating valve 373. Lastly, the water in the bubble condenser 314 can be recirculated back to the production water tank 302 if the supply of production water becomes interrupted or is lower than expected. In this event, rather than shutting down the water purification system 300, the water can be recirculated and undergo continued processing until the production water is again available. It can be appreciated that shutting down of the system may be an involved procedure, as well as the restarting thereof, and thus it is highly advantageous to maintain continuous operation of the system 300. The other water purification systems disclosed herein can also take advantage of this feature.

Any uncondensed vapors in the top of the bubble condenser 314 can be removed via valve 376 and air dryer 378 and fed back to the burner 304 and combusted with the hydrogen and oxygen gasses.

As noted above, the slurry accumulated in the bottom of the flash chamber tank 312 can be removed therefrom by valve 358 and pumped to the slurry tank 318. Similarly, the liquid contents of the flue gas scrubber 344 can be removed via valve 380 and also pumped to the slurry tank 318. The feed water filter 352 can be cleaned by opening valve 382 and the residue carried to the slurry tank 318.

The slurry tank 318 is effectively a separation tank where the various contents, both liquid, gas and solids will separate in a natural manner according to weight. The gasses will collect in the dead air space 384 at the top of the slurry tank 318. Particulate matter in the form of crystallized minerals, inorganic matter and metals will form a layer 386 at the bottom of the slurry tank 318. A vibrator, not shown, can be fitted to the slurry tank to agitate the solution to separate the components thereof by weight. The accumulation of sludge 386 can be removed from the slurry tank 318 by way of outlet 387. Metals of desired value can be reclaimed from the sludge 386. A transition layer 388 above the crystallized mineral layer 386 includes liquids and solids that have been pumped into the slurry tank 318 and have not yet risen, or fallen to the bottom. A layer of water 390 will form above the transition layer 388 of material. The water 390, which is not pure or fresh, can be returned to the water purification system 300 for reprocessing via the line 392 to a valve 394. From the valve 394, the water to be reprocessed is carried to the flue gas scrubber 344. A flow meter 396 is provided to determine the volume of water returned from the slurry tank 318 to the system 300 to be reprocessed.

Floating on the layer of water 390 can be a biomass layer of liquids lighter in weight than the water in layer 390. The biomass layer 398 can contain oily liquids and other organic liquids. A liquid level sensor 404 is provided with the slurry tank 318 to sense the level of the biomass 398. Material or liquid can be automatically removed from the slurry tank 318 when the top of the biomass layer 398 is sensed at the level of the sensor 404. The biomass layer 398 can be removed from the slurry tank 318 via the biomass outlet 400 and disposed of appropriately. The upper volume of the slurry tank 318 contains vapors that can be removed therefrom via gas outlet 402 and coupled back to the burner 304 to be combusted with the other volatile gases.

While not shown, various sensors, including temperature, pressure, flow rate, salinity, etc., are utilized in the water purification system 300, but for purposes of simplicity, are not shown. Also, numerous anodes are used to prevent corrosion and deterioration of the metal components of the system 300.

Figure 5:
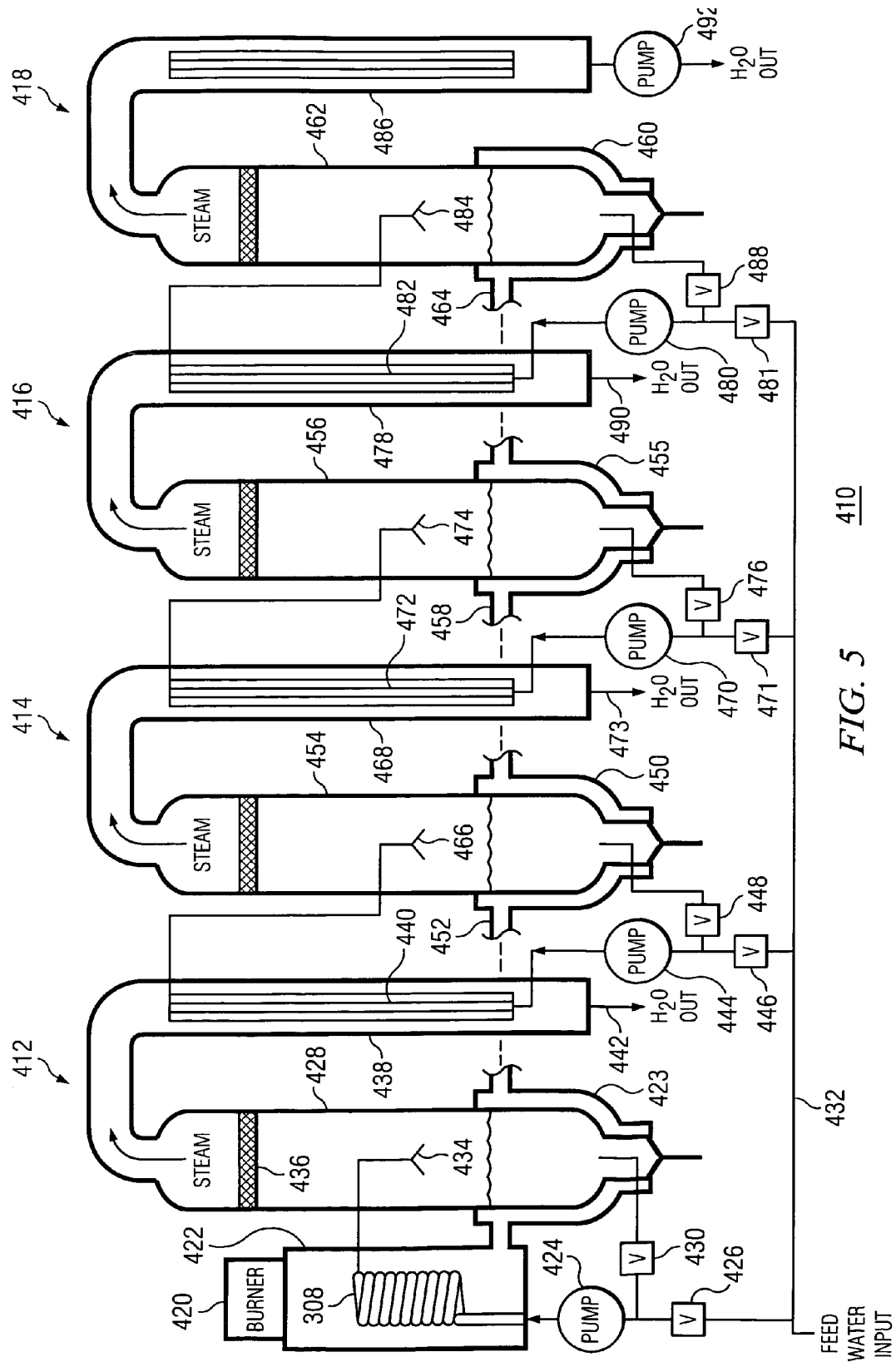
FIG. 5 is a drawing illustrating a four effect water purification system according to yet another embodiment of the invention.

In order to increase the efficiency of a water purification system, multiple stages of flashing and condensation can be carried out, where each successive stage employs the unused thermal energy of the preceding stage. A four-effect stage water purification system 410 is illustrated in FIG. 5. The purification stages include a first purification stage 412, a second purification stage 414, a third purification stage 416 and a fourth purification stage 418. In the example, each water purification stage is about ninety percent efficient in using the available thermal energy. By varying the temperature and pressure parameters between the stages, fewer or more than four stages are possible. A first water purification stage 412 heats feed water, creates steam that is fed to a second water purification stage 414, and produces purified water that is transported or stored elsewhere. In the multi-effect water purification system 410 illustrated in FIG. 5, a high feed water volume, low pressure mode of operation is employed.

The first water purification stage 412 employs a 1.5 million BTU burner 420 that heats a combustion chamber 422 with a helical coil 308 located therein. The heat generated by the burner 420 is forced around the helical coil 308, and therefrom into a jacket 423 which surrounds the bottom of the expansion chamber tank 428 of the first purification stage 412. The feed water is applied to a pump 424 by way of a valve 426. Periodically, uncondensed water in the flash chamber tank 428 of the first stage 412 is recirculated to the pump 424 by valve 430. The feed water from the gas well is simultaneously applied to each of the three subsequent purification stages 414, 416 and 418 by feed water line 432. The pump 424 preferably produces a feed water pressure of about 40 psig through the helical coil 308 and to an expansion nozzle 434 located in the expansion chamber tank 428. With a ninety percent efficiency of the thermal energy produced by the burner 420, the high temperature feed water coupled through the helical coils 308 to the expansion nozzle 434 results in an output of about 1.35 million BTU/hour. The feed water preferably is heated above a temperature of about 288 degrees F. in the first water purification stage 412, at a pressure sufficient to avoid flashing steam in the helical coil. Flashing occurs when the hot water is dispersed as fine droplets from the expansion nozzle 434 into the cooler atmosphere of the expansion chamber tank 428. Heated feed water that does not flash into steam, falls to the bottom of the expansion chamber tank 412 and can be recirculated for reheating and reprocessing, as noted above.

Steam resulting from the flashing of the high temperature feed water passes through a demisting mesh screen 436 to prevent water droplets from being carried upwardly with the steam. The steam generated from the first stage 412 is carried to a heat exchanger 438. The steam generated by the first purification stage 412 is the source of thermal energy for heating cool feed water processed by the second purification stage 414. The heat exchanger carries out two functions. First, the steam generated by the first purification stage 412 functions to heat the cool feed water input to the second purification stage 414. Secondly, when the steam contacts the tubing 440 carrying the cool feed water of the second stage 414, it condenses to pure water and collects at the bottom of the heat exchanger 438. Fresh water can be extracted through a valve (not shown) at the outlet 442 located at the bottom of the heat exchanger tank 438 of purification stage 412 of the multi-effect system 410. It is expected that the first purification stage 412 produces pure water at a rate of about 3.06 gpm.

Feed water is pumped by a pump 444 via valve 446 of the second purification stage 414 to the tubing 440 of the heat exchanger 438 of the first purification stage 412. In order to recirculate heated water not flashed to steam in the second purification stage 414, such water can be recirculated via valve 448 to the pump 444 and thus to the heat exchanger 438. Importantly, residual thermal energy not absorbed by the first purification stage 412 is coupled from the jacket 423 of the first stage 412 to the jacket 450 of the second stage 414, via the interconnecting pipe 452. Like the jacket 423 of the first stage, the jacket 450 of the second stage envelopes the lower part of the expansion chamber tank 454. The residual thermal energy not absorbed by the second stage 414 is coupled to the jacket 455 of the expansion chamber tank 456 of the third stage 416 via interconnecting tubing 458. In like manner, the residual thermal energy not absorbed by the third purification stage 416 is coupled to the jacket 460 of the expansion chamber tank 462 of the fourth purification stage 418, via interconnecting tubing 464. While not shown, the jackets and interconnecting tubing of the four stages are insulated to prevent escape of the thermal energy.

The feed water coupled through the tubing 440 of the first stage heat exchanger 438 is heated to above about 250 degrees F., at a pump pressure sufficient to avoid flashing into steam in the condenser. The thermal energy generated by the second purification stage 414 is thus about 1.215 million BTU/hour. The heated, pressurized feed water forced through the heat exchanger 438 is coupled to an expansion nozzle 466 in the second stage expansion chamber tank 454. The heated feed water flashes into steam which rises and is coupled to a second stage heat exchanger 468. Heated feed water that does not flash into steam settles to the bottom of the expansion chamber tank 454. The steam generated in the second stage expansion chamber tank 454 condenses in the heat exchanger 468 when it contacts the tubing 472. The condensed water falls to be bottom of the heat exchanger 468 and can be removed via outlet 473. It is expected that the second purification stage 414 produces pure water at a rate of about 2.68 gpm.

Feed water from line 432 is pumped by pump 470 via valve 471 through the tubing 472 of the second stage heat exchanger 468 where it is heated by the steam produced by the second purification stage 414. The feed water exits the heat exchanger 468 at a temperature of about 211 degrees F. and at a pressure sufficient to avoid flashing into steam in the tubing. The heated water is forced through an expansion nozzle 474 in the expansion chamber tank 456 of the third purification stage 416. The output of the third purification stage 416 is about 1.0935 million BTU/hour. Heated water that does not flash into steam in the expansion chamber tank 456 settles to the bottom, and can be extracted via a valve 476 and recirculated for reprocessing by the pump 470.

Steam generated by the third purification stage 416 is coupled to a third stage heat exchanger 478 where it heats cool feed water pumped by a fourth stage pump 480 via valve 481 through heat exchanger tubing 482. The steam from the third purification stage 416 heats the cool feed water in heat exchanger 478 to a temperature of above about 174 degrees F.

The heated water is coupled through the heat exchanger tubing 482 to an expansion nozzle 484 located in a fourth stage expansion chamber tank 462. The pressure of the heated feed water fed to the fourth stage expansion chamber tank 462 is a negative pressure of about −6.6 psig. With this pressure and temperature, the heated water flashes into steam, whereupon the steam rises and is coupled to a fourth stage heat exchanger 486. The heated water that does not flash into steam settles to the bottom of the expansion chamber tank 462. The heated feed water at the bottom of the expansion chamber tank 462 can be recirculated via the pump 480 and the valve 488 to the heat exchanger 478. Fresh water can be extracted from the bottom of the heat exchanger 478 via the outlet 490. It is expected that the third purification stage 416 produces pure water at a rate of about 2.35 gpm.

Lastly, steam generated in the fourth stage expansion chamber tank 462 is coupled to a fourth heat exchanger 486 which functions to condense the steam into purified water. The condensed water settles to the bottom of the heat exchanger 486 and can be extracted by the pump 492. The pump 492 extracting water from the heat exchanger 486 causes the negative pressure to exist in the expansion chamber tank 462. It is expected that the fourth purification stage 418 will produce about 2.06 gallons of purified water per minute.

With the four purification stages operating simultaneously to process feed water and purify the same, about 10.15 gallons of purified water can be produced each minute, with a substantial savings in thermal energy.

Figure 6:
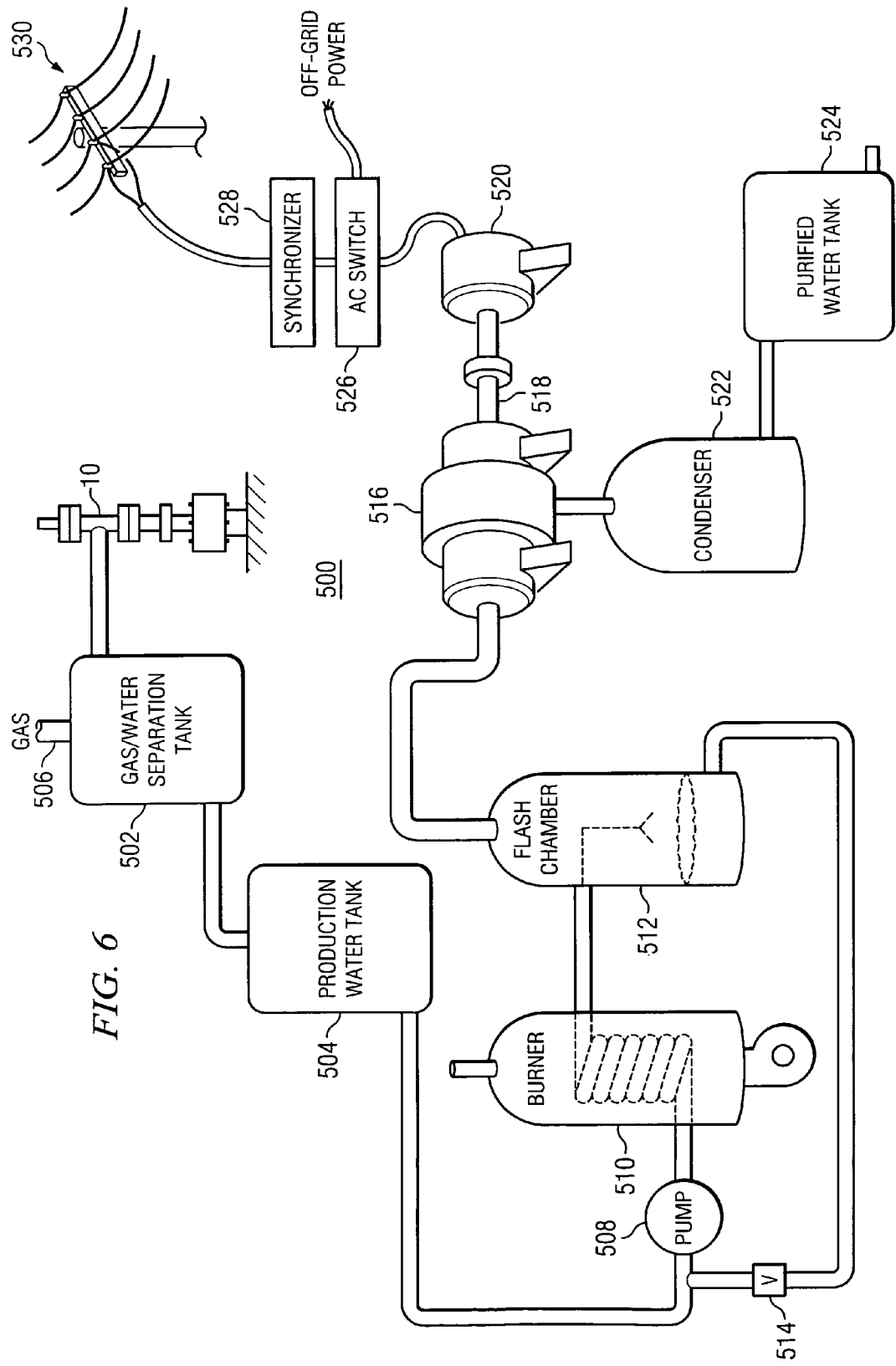
FIG. 6 is a drawing illustrating a system adapted for purifying production water from a gas well using steam/evaporation techniques, and using the steam to drive a turbine to generate electricity or drive a pump.

FIG. 6 illustrates a system in simplified form adapted for both purifying production water from an oil or gas well, and generating electricity for consumer use. A gas well 10 produces a mixture of gas and water from the down hole casing. The mixture is coupled to a gas/water separation tank 502 where the water settles to the bottom of the tank 502, and the gas rises and is available as natural gas at the outlet 506. The production water is fed to a tank 504 and therefrom to a pump 508. The pump pumps the production water to a burner 510 which heats the water to a high temperature. The heated water is fed to a flash chamber 512 where it is forced though an expansion nozzle where steam is generated. Water that is not converted to steam settles to the bottom of the flash chamber 512. The water not converted to the gas phase in the flash chamber 512 can be recirculated through the valve 514 and reprocessed through the water purification system 500.

Importantly, the steam generated in the flash chamber 512 is coupled to a steam turbine 516 where it is used to turn a single stage or multi-stage turbine to provide torque at an output shaft 518. The steam turbine 516 is connected to an electrical generator 520 for generating AC power. Alternative, the torque generated by the turbine 516 can be used to operate a pump. The spent steam from the turbine 516 is coupled to a condenser 522 which condenses the steam into purified water. The purified water is fed to a holding tank 524 where it is temporarily stored until transported away or otherwise disposed of in a proper manner.

The AC power generated by the generator 520 can be coupled to a switch 526 for providing AC power to off grid consumers, such as a business, residential homes, etc. This off grid power is provided independently of the public utility power provider, and can represent a cost saving to the users. When the switch 526 is switched, the AC power generated by the generator 520 can be fed to a synchronizer 528 for synchronizing the AC power with that of the power grid carried by transmission lines 530, or the like. In this state, the AC power generation facilities at a gas well can supplement the AC power of the grid, and can be compensated for accordingly. It can be appreciated that with the cost of the natural gas being competitively priced, electrical power can be generated at a rate per KW/hr more cheaply than can the public utility. Accordingly, the modified water purification system 500 can become cost effective more quickly and recover the cost thereof in a short period of time. It should be appreciated that the water purification system 500 can implement many of the features of the other purification systems described above, and vice versa.

Figure 7:
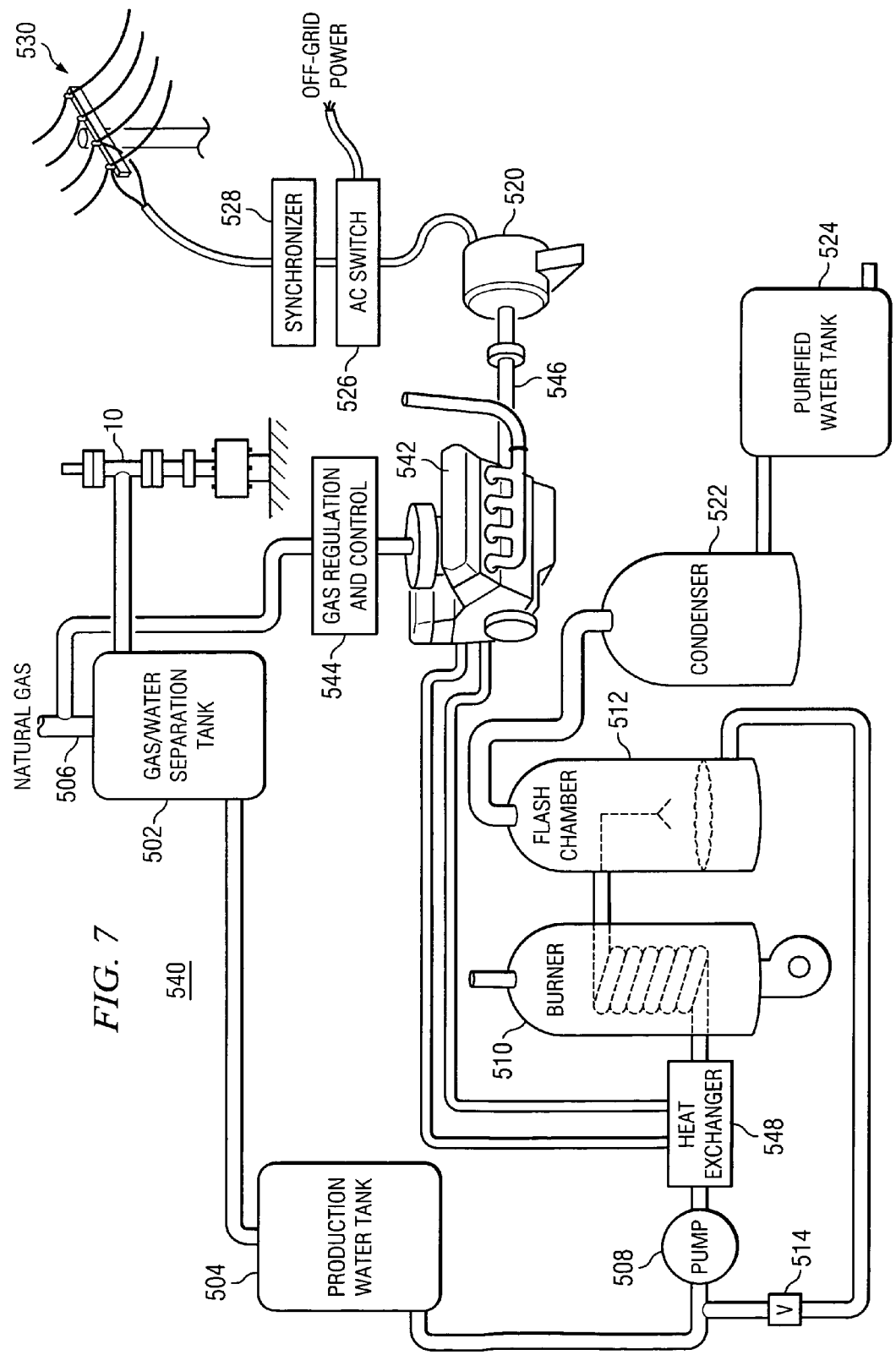
FIG. 7 is a drawing illustrating a system adapted for purifying production water from a gas well, and using natural gas to drive an engine or turbine to drive either a generator to generate electricity or a local pump.

FIG. 7 illustrates in simplified form a system 540 adapted for purifying production water from a natural gas well 10, and for using the natural gas to drive a gas engine which, in turn, drives an electrical generator 520. Alternatively, a gas turbine can be employed in lieu of the gas engine 542. In addition, the gas operated apparatus can be used to drive a pump, rather than a generator 520. The water purification system is similar to that described above in connection with FIG. 6, but here the steam is flashed and converted directly into water in the condenser 522.

In accordance with an important feature of the invention, natural gas from the well 10 is coupled to the gas engine 542, by way of a gas regulation and control system 544. The gas control system 544 regulates and purifies the natural gas and otherwise controls it for use by the internal combustion engine 542. The engine 542 produces torque at an output shaft 546 for driving the electrical generator 520. The AC power from the generator 520 can be distributed in a manner similar to that described above with FIG. 6. Again, a cost analysis shows that when using natural gas directly from the well 10 to generate electricity using an internal combustion engine 542, there is a cost savings in KW/hr compared to that of the public utility company. A pump driven by the engine 542 or turbine can serve one or many uses during the onsite drilling, fracking and production phases.

The gas engine 542 or turbine can be fitted with a cooling jacket in which water is circulated through and around the engine block to maintain a desired operating temperature. In accordance with a feature of the invention, the water heated by the engine can be carried to a heat exchanger 548 to preheat the feed water carried from the production storage tank 504 and pumped by pump 508. Rather than burner 510 as shown in FIG. 7, or in addition thereto, the preheated feed water can be carried to the helical coil to be superheated by the exhaust gases from the engine 542 or turbine. Processing the water continues as described above. With this arrangement, the heat generated by the engine 542 is not lost, but rather is used to heat the feed water. For example, a 200 hp engine will generate 400 hp of heat, equivalent to about one million BTU. Additionally, the engine 542 or turbine can be enclosed in an insulated compartment to prevent the escape of heat therefrom. The heat radiated from the engine 542 can be coupled to other parts of the water purification system 540 to preheat the water at various stages, or to heat other items that require the same.

Figure 8C:
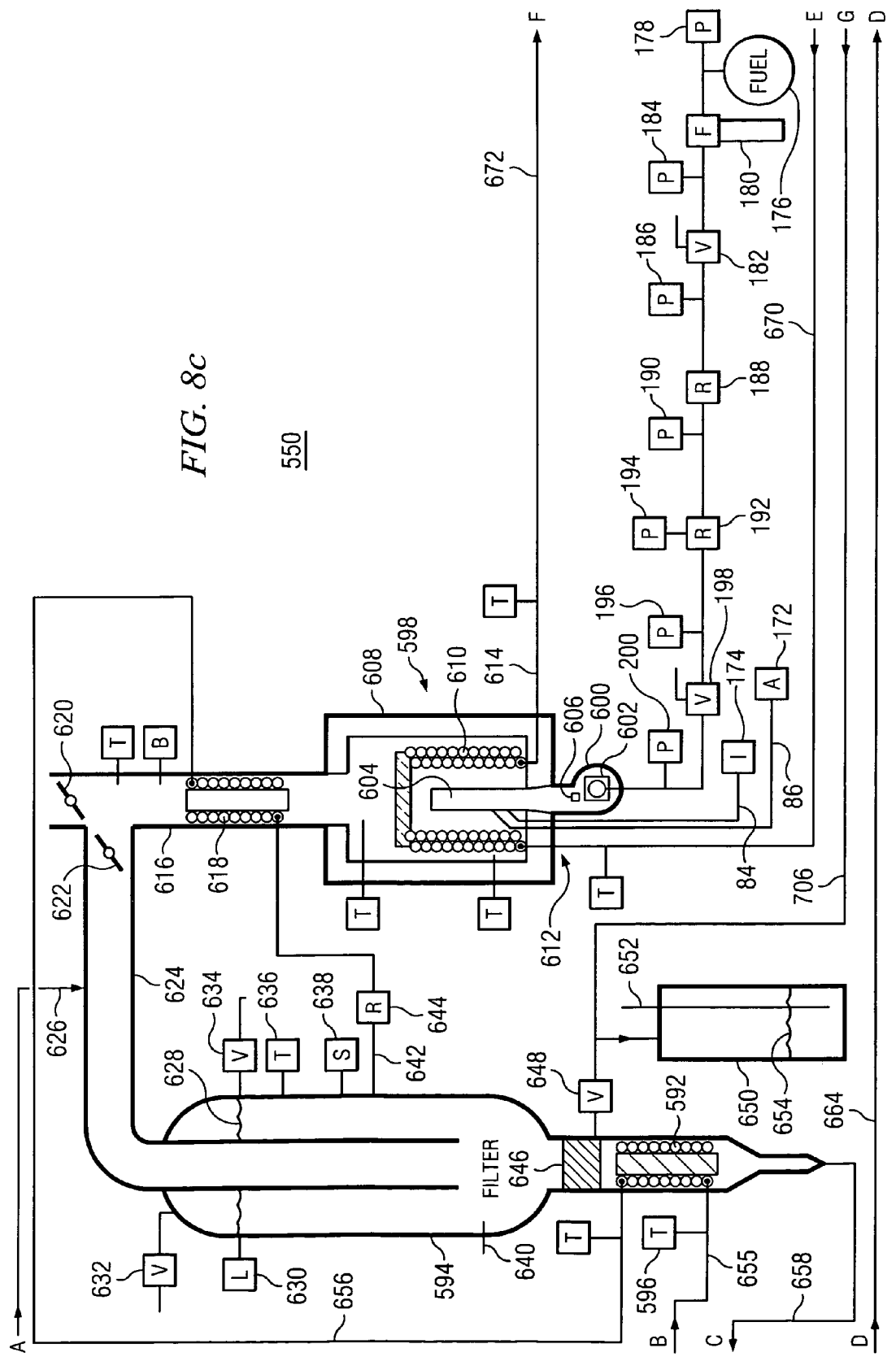
FIG. 8c illustrates a portion of the liquid processing system that preheats and heats the production liquid to a high temperature.
Figure 9:
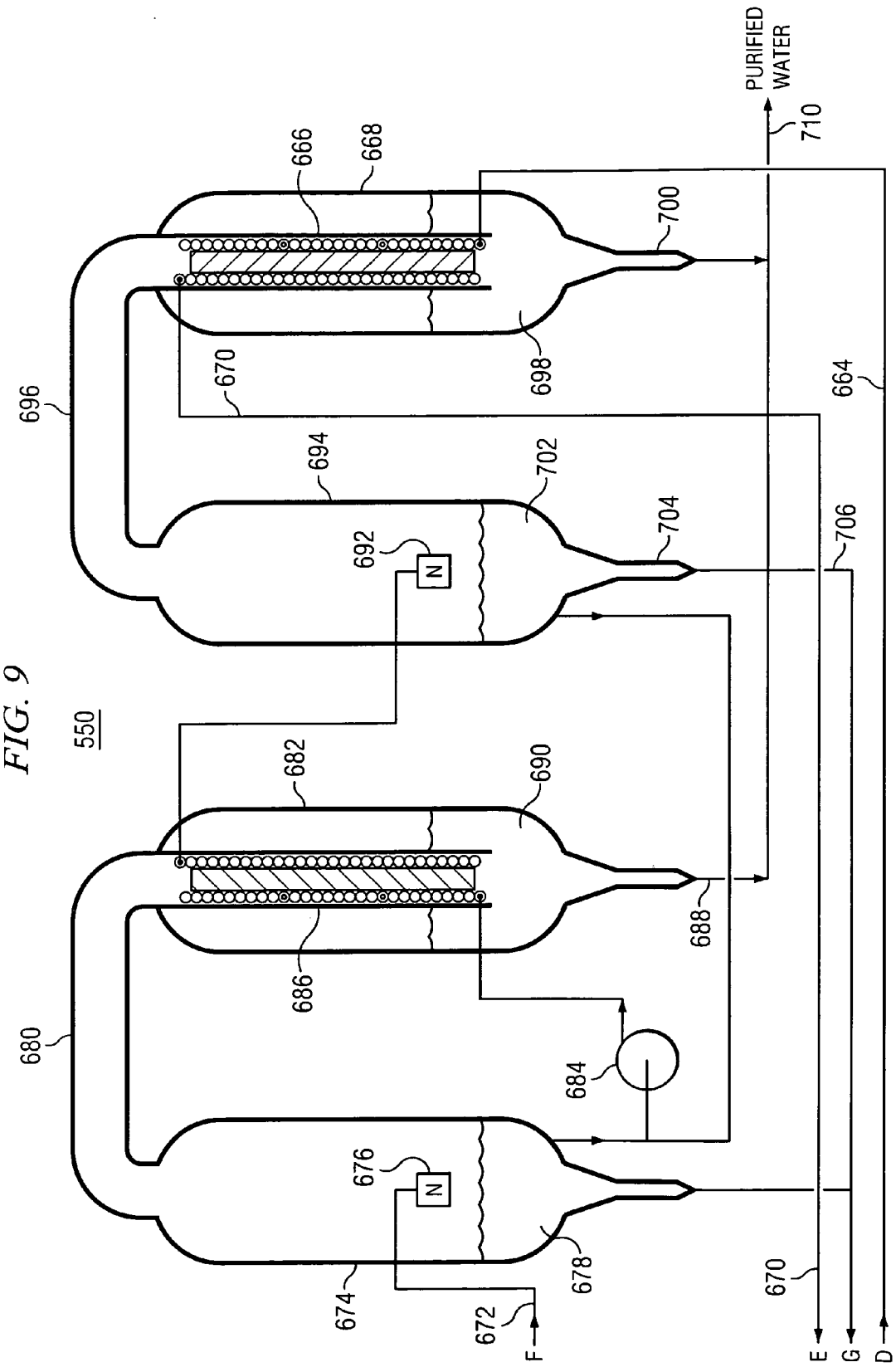

Illustrated in FIGS. 8a-c and 9 is another embodiment of the production water processing system 550 constructed according to the principles and concepts of the invention. It should be noted that the apparatus of FIGS. 8a-c are all mounted on one skid or module as a unit that can be transported from one location to another location. The apparatus shown in FIG. 9 is mounted on a second skid as a transportable module. The two modules are coupled together in a manner described below. Alternatively, the apparatus of FIGS. 8a-8c and 9 can be coupled together and mounted on a single larger skid to allow convenient transportation from one site to another site. A fork lift can load and unload the skid-mounted apparatus from a transport carrier without requiring heavy duty equipment, or requiring fabrication of the system on the site, as is needed for many water purification systems. With reference to FIG. 8a, there is depicted the equipment employed in coupling the production water to the downstream processing apparatus. Plural computer-controlled input valves 560 are provided for coupling liquids in various stages of processing to a filter 562. One input valve controls the feed water input from the storage tank 16. Another input valve controls the reprocessing of the water from a sludge tank 650 shown in FIG. 8c. A third input valve controls the input of fresh water generated by the system 550 to clean and flush the same when desired. The input valves 560, as well as many of the other valves and sensors of the system 550 are computer controlled or monitored to provide overall control of the various steps in processing the production water from the gas or oil well. As such, one or more of the input valves 560 can be activated at the same time to mix water from the various stages to proceed in processing the same. However, it should be understood that the water processing system 550 can be used for many other purposes, including simply purifying water from polluted streams and lakes to provide drinking water.

Respective input and output pressure sensors 564 and 566 are provided to determine the state of the filter 562 as to whether cleaning or backwashing is required. A manual-controlled valve 568 is provided to control the water input to the system 550. From the manual valve 568, water is coupled to a pump driven by a DC motor 570. The speed of the DC motor 570 can be controlled by varying the DC current thereto from the processor 42. The speed of the DC motor 570 is varied to maintain a predetermined level of production water in a separation chamber 594 shown in FIG. 8c. A temperature sensor 572 senses the operating temperature of the DC motor to assure that it remains within specified limits. A sacrificial anode 574 is provided to minimize deterioration of the metals of the system 550 due to electrolysis. A check valve 576 and a flow rate gauge 578 are connected in series. A pressure sensor 580 senses the pressure of the production water pumped by the DC motor 570. In addition, the pressure sensor 580, together with a second pressure sensor 586, provide indications when a second filter 588 requires backwashing to remove particulate matter therefrom. A temperature sensor 584 senses the temperature of the production water after pumping by the DC motor 570. A valve 590 controls when the filter 588 is to be backwashed using water processed by the water purification system 550. In the preferred embodiment of the invention, the production water provided at the output of the filter 588, at point B in the drawing, is at a pressure of about 30 psi and temperature of about 80 degrees F.

Referring now to FIG. 8c, the production water at point B is coupled to a helical coil 592 housed at the bottom of the separation chamber vessel 594. A temperature sensor 596 senses the temperature of the production water as it enters the separation chamber 594. As described above, the production water is preheated and further heated by the thermal exchange between the separation chamber 594 and the burner assembly 598.

The heat-generating equipment of the water purification system 550 shown in FIG. 8c includes a high efficiency burner 598 which includes a blower 600 having a venturi/gas nozzle 602 connected to a supply 176 of gas, preferably from the gas well being placed into production. However, bottle gas or other gas sources can be employed. The fuel feed and control equipment is substantially the same as shown and described above in conjunction with FIG. 2c. The burner 598 further includes a mesh tube 604 for converting the flame from the venturi/nozzle 602 into thermal energy at a rate of about 1,000,000 BTU per hour. A pressure gauge/sensor 606 is mounted to the blower 600 to monitor the heat generating parameters thereof. The blower 600 is mounted to an insulated housing 608 so that the mesh tube 604 is centered within a pair of helical coils 610 connected together so that production water is input at the bottom 612 of an outer coil and output from the bottom 614 of the inner coil. Water is exposed to the heat generated by the burner 598 as it spirals upwardly in the outer coil, and again as the water spirals downwardly in the inner coil of the dual helical coils 610. The water processed through the burner 598 reaches a temperature of about 550 degrees F. when output therefrom. Temperature sensors located at the top and the bottom portion of the burner compartment measure the temperature at the respective locations. As will be described below, the high pressure pump 144 (FIG. 8b) pumps the water through the burner 598 at a pressure of about 2,000 psi, and at the rate of about 5.1 gallons per minute.

The flue gas generated by the burner 598, which amounts to about 100,000 BTU, that is not used to heat the water pumped through the dual helical coils 610, is force upwardly in a flue 616. In passing upwardly, the flue gas passes through a single stage helical coil 618 located in the flue 616. The top of the flue stack 616 opens to the atmosphere via a damper 620, when open. A major portion of the flue gas passes by an open damper 622 into a flue 624 that is coupled to the separation chamber 594. In normal operation, the damper 622 is open and the damper 620 is closed. During start up of the system 550, the damper 620 is open and the damper 622 is closed to vent the flue gas until the burner 598 has reached the desired operating conditions. During emergencies and other situations, the damper 620 can be operated to an open or intermediate position.

In accordance with an important feature of the water purification system 550, the natural gas engine 160 not only drives the high pressure pump 144 (FIG. 8b), but the thermal energy from the exhaust generated by the engine 160 is coupled via an insulated pipe 626 to the flue 624. The thermal energy from the exhaust of the engine 160 is expected to be about 400 degrees F. The excess or left-over thermal energy from the burner 598 is combined with the engine exhaust thermal energy in the flue 624 and coupled to the separation chamber 594. The water in the separation chamber 594 is maintained at a predetermined level 628, as measured by the level sensor 630, and controlled by the DC motor 570 which drives a pump. The bottom open end of the flue 624 extends well below the water level 628 to provide a maximum amount of surface area to the water within the separation chamber 594. This allows the maximum transfer of thermal energy from the hot gasses to the water. The pressure in the separation chamber 594 above the water level 628 is preferably atmospheric pressure. Flue and exhaust gasses, and other volatilized vapors can be removed from the top of the separation chamber 594 by way of a valve 632. Another valve 634 can be operated to allow organic liquids to be removed from the top of the separation chamber 594. The temperature of the top portion of the water can be measured by a temperature sensor 636. The temperature of the water is an indication of the efficiency by which the thermal energy is transferred from the flue gas to the water in the separation chamber 594. A pressure switch 638 functions to sense the pressure of the liquid in the separation chamber 594, and is processor monitored to control the pump 570 to generally maintain atmospheric pressure within the oil separation chamber 594. A sacrificial anode 640 is fixed to the wall of the metal separation chamber 594 and extends into the water.

The water in the separation chamber 594 is coupled by a pipe 642 to the single stage helical coil 618 located in the vertical flue 616 of the burner 598. The transfer of heated water therebetween is controlled by a regulator valve 644. Located at the bottom of the separation chamber 594 is a mesh filter 646 of the self cleaning type, or a cyclone filter, for collecting particulate matter that has settled to the bottom of the chamber 594. The solids, in the form of sludge, can be removed from the particulate filter 646 by operating a valve 648. When the valve 648 is operated, the sludge is carried by gravity flow to a sludge tank 650. A vacuum can be applied to a siphon tube 652 to pull the sludge 654 from the sludge tank 650 and dispose of the same in a suitable manner. Other sludge pumping equipment or sludge moving devices can be used to remove the sludge from the chamber 594. The circuit taken by the production water is according to the arrows in FIG. 8c, namely, into the bottom of the single stage helical coil 592 located in the bottom of the separation chamber 594, out of the top of the coil 592 into pipe 656, and into the top of the single stage helical coil 618 located in the vertical flue 616 of the burner 598. From the bottom of the helical coil 618, the preheated production water flows through pipe 642 into the separation chamber 594, and out of the bottom of the separation chamber via pipe 658 to the input of the high pressure pump 144 shown in FIG. 8b. It should be noted that the interaction between the burner 598 and the separation chamber 594, in terms of both the liquid and thermal energy, can be employed in other water and liquid processing systems in which efficient thermal energy conservation is important.

The high pressure pump 144 is preferably of the reciprocating type that can pump medium temperature liquids at high pressures, upwardly of 2,000 psi to about 5,000 psi. Similar to the pump 144 of FIG. 2c, the high pressure pump 144 is belt driven by an engine 160. An oiler 162 is provided to add pump oil to the pump 144. The production water at the inlet to the high pressure pump 144 is monitored by a pressure sensor 660 and a temperature sensor 662. The high pressure water at the outlet of the pump 144 is monitored by a pressure sensor 166. A relief valve 164 is also coupled to the outlet pipe 664 of the high pressure pump 144. As noted above, the pressure of the production water at the outlet of the pump is preferably about 2,000 psi. The outlet pipe 664 is a flexible, high pressure hose for connecting the high pressure production water from the first module to the adjacent module which contains the equipment shown in FIG. 9.

The high pressure production water preheated to a temperature of about 140 degrees F. is carried by the flexible pipe 664 and transferred to the bottom of a triple-section helical coil 666 located in a bubbler-type condenser 668. This is illustrated in FIG. 9. Steam input at the top of the bubbler condenser 668 condenses when coming into contact with the cooler helical coils 666. From the top of the triple-section helical coils 666, the production water is forced through tubing 670 to the inlet 612 of the burner coils 610, shown in FIG. 8c. A portion of the tubing is flexible to facilitate dynamically connecting the first and second modules together. When traversing the dual section helical coils 610 in the burner assembly 598, the production water is heated to about 550 degrees F. From the dual helical coil 610, the high temperature, high pressure production water is carried in pipe 672 to an expansion chamber 674. Again, a portion of the tubing 672 is flexible and suitable for carrying high temperature and high pressure liquids between the two modules. The production water is then forced through an expansion nozzle 676 where it is released in the chamber 674. The expansion chamber 674 has an internal pressure of about 10 psi so that the high temperature water quickly flashes into steam. The production water 678 that does not flash into steam falls to the bottom of the expansion chamber 674. The steam formed in the expansion chamber 674 is about 240 degrees F., and is carried by the tubing 680 to the top of a second bubbler condenser 682. While not shown, there is a demisting filter at the top of both the expansion chambers 674 and 694. The water collected at the bottom of the expansion chamber 674 is about 240 degrees F., and is pumped by pump 684 to the bottom of a triple-section helical coil 686 located centrally in the bubbler condenser 682. At the inlet of the pump 684, 240 degrees unflashed water from the expansion chamber 674 is combined with the 212 degrees unflashed water from the other expansion chamber 694. When the 240 degrees F. steam contacts the cooler helical coils 686 through which the 200-220 degrees F. water flows, condensation of the steam into water occurs. The condensed steam is a purified form of water 690 that collects at the bottom of the bubbler condenser 682. The purified water 690 can be transferred from the bubbler condenser 682 by way of pipe 688 to a collection tank or other type of reservoir. When cooled, the purified water can be fed back into streams, lakes or used for industrial or municipal purposes. The purified water can be further processed to imbue therein a taste to which persons recognize as drinking water.

As noted above, the pump 684 pumps the unflashed water from the first expansion chamber 674 to the bottom portion of the triple-section helical coil 686 to provide a cooler condensing mechanism in the bubbler condenser 682. The unflashed water pumped through the triple-section helical coil 686 exits the top thereof at about 230 degrees F. and is forced through an expansion nozzle 692 in a second expansion chamber 694. The heated water that exits the nozzle 692 flashes into steam in the second expansion chamber 694 and passes through the tube 696 to the bubbler condenser 668 described above. The steam that contacts the triple-section helical coil 666 in the other bubbler condenser 668 condenses into purified water 698 and collects at the bottom of the condenser 668. The outlet 700 of the condenser 668 can be coupled to the outlet 688 of the other condenser 682 and routed to a holding tank or reservoir (not shown). The purified water can be used for any purpose as the particulate matter and other organic liquids have been removed.

The water 702 that does not flash into steam in the second expansion chamber 694 can be collected at the output 704 and returned to the high volume pump 684 and repumped through the triple-section helical coil 686 to be reheated by the steam from the first expansion chamber 674 to be flashed into steam in the second expansion chamber 694. It can be appreciated that the unflashed water in both the expansion chambers 674 and 694 is repeatedly processed to be reheated and flashed in the second expansion chamber 694. The solids and particulate matter resulting from the flashing of the production water in both expansion chambers 674 and 694 settle to the bottom and can be collected at the output 706. The solids settled out in the bottom of the expansion chambers 674 and 694 can be separated using baffles and the like, or other suitable methods. The solid material in the form of a sludge separated and carried to the common outlet 706 can be returned to the sludge tank 650 shown in FIG. 8c. A portion of the tubing 706 is preferably flexible as it connects the first and second modules of the water purification system together.

In terms of thermal efficiency of the system 550, it is noted that the burner 598 generates about 1,000,000 BTU of energy. It is believed that about 900,000 BTU of this energy is absorbed by the production water carried through the dual helical coils 610 located in the burner compartment 608. The remaining 100,000 BTU of energy is transferred in the vertical flue 616 of the burner 598, but such left-over energy is used to preheat the production water pumped through the helical coil 618 located in the vertical flue 616 of the burner 598. The thermal energy that escapes up the flue 616 of the burner 598 is then coupled to the separation chamber 594 to heat the production water therein to raise the temperature thereof. In addition, the thermal energy from the exhaust of the engine 160 is combined with the remaining flue gas in the flue 624 and coupled to the separation chamber 594 to further raise the temperature of the production water therein.

The details of the water preheating circuit in FIG. 8c are as described below. The production water input to the helical coil 592 located in the bottom of the separation chamber 594 is initially at a temperature of about 80 degrees F. The 212 degrees F. water in the separation chamber 594 preheats the production water from the 80 degrees F. to about 120 degrees F. when such water exits the helical coil 592. The preheated production water is then coupled to the top of the helical coil 618 in the vertical burner flue 616, where it is then further preheated to about 240 degrees F. The 240 degrees water is then coupled from the burner flue helical coil 618 to the separation chamber 594 where it is further heated to the boiling point of water (212 degrees F.) by the combined flue gas and the engine exhaust gas. In the separation chamber 594, the liquids that are lighter than water rise to the top and are removed via the valve 634. The volatile vapors from the boiling production water in the separation chamber 594, together with the flue and exhaust gasses, rise to the top thereof and are removed via the valve 632. Thus, the separation chamber 594 separates the volatile gases and other liquids lighter in weight than the water portion of the production water. At the bottom of the separation tank 594, the heat exchanging coil 592 removes heat from the water therein such that the water exiting the bottom of the separation chamber 594 is at a temperature of about 140 degrees F. The production water circulated in the portion of the system shown in FIG. 8c is at a rate of about five and one half gallons per minute. It is seen that the system contained in the first module (FIGS. 8a-8c) operate at a high temperature, high pressure and relatively low volume.

The processed production water exiting the bottom of the separation chamber 594 is carried to the input of the high pressure pump 144 (FIG. 8b) where the pressure thereof is increased to about 2,000 psi. The high pressure production water which is about 140 degrees F. is then carried to the second module (FIG. 9) where it is processed in the bubbler condenser coils 666 of the bubbler condensing unit 668. As noted above, the steam coming into the bubbler condenser 668 condenses on the cooler surfaces of the coils 666 and forms purified water which collects at the bottom and is carried away via the system output pipe 710. Because of the hot steam contacting the coils 666 in the bubbler condensing unit 668, the production water carried through such coils 666 is heated to a temperature of about 212 degrees. The 212 degrees F. water is carried to the input of the burner 598 of the first module where it is heated to a high temperature of about 550 degrees F. The high temperature, high pressure water exiting the burner 594 is carried to the second module where it is flashed in the expansion chamber 674 by nozzle 676. The steam at the top portion of the expansion chamber 674 is about 240 degrees F. at a pressure of about 10 psi. As noted above, the high temperature, high pressure water carried from the burner 598 to the expansion chamber 674 carries with it a thermal energy of approximately 900,000 BTU. The steam resulting from the flashing of the production water in the expansion chamber 674 is carried to the bubbler chamber 682 where it contacts the cooler helical coils 686 and condenses into a purified form of water. The purified water 690 is collected at the bottom of the bubbler chamber 682 and is carried away by the system outlet 710.

The foregoing describes the processing of that part of the production water that is flashed into steam and condensed into purified water. In both of the expansion chambers 674 and 694, there is a portion of the production water that is not converted to steam, but remains in the liquid form and is collected at the bottom of the respective expansion chambers. In expansion chamber 674, about two gallons of hot water per minute is not converted to steam and collects in the bottom thereof. About 1.5 gallons of water per minute remains in the liquid state in the expansion chamber 694 and collects at the bottom thereof. Accordingly, the pump 684 pumps the unflashed water from both expansion chambers 674 and 694 to be reprocessed. The reprocessing of the unflashed production water is pumped through the triple-section coils 686 in the bubble chamber 682 and carried to the expansion chamber 694 where it is flashed into steam. As noted above, the unflashed water pumped through the triple-section helical coils 686 serves two functions. First, the water pumped into the coils 686 is about 200 degrees F., which is low enough to condense the 240 degrees steam which contacts such coils 686 in the bubbler condenser 682. As a result of this action, the unflashed water pumped through the coils 686 rises in temperature from 200 degrees to about 230 degrees, which is sufficient to flash when exiting the nozzle 692 in the other expansion chamber 694. In the secondary stage of processing, which involves the loop in which the pump 684 pumps water, the unflashed water is processed at a high volume of about sixty gallons per minute, but at lower temperature and pressure conditions, as compared to the 550 degrees, 2,000 psi water flashed in the first expansion chamber 674. A very high efficiency water purification system is thus achieved. The feature of the invention in which there is a subloop for reprocessing unflashed water can be employed in other types of condensing and evaporation systems.

Figure 10:
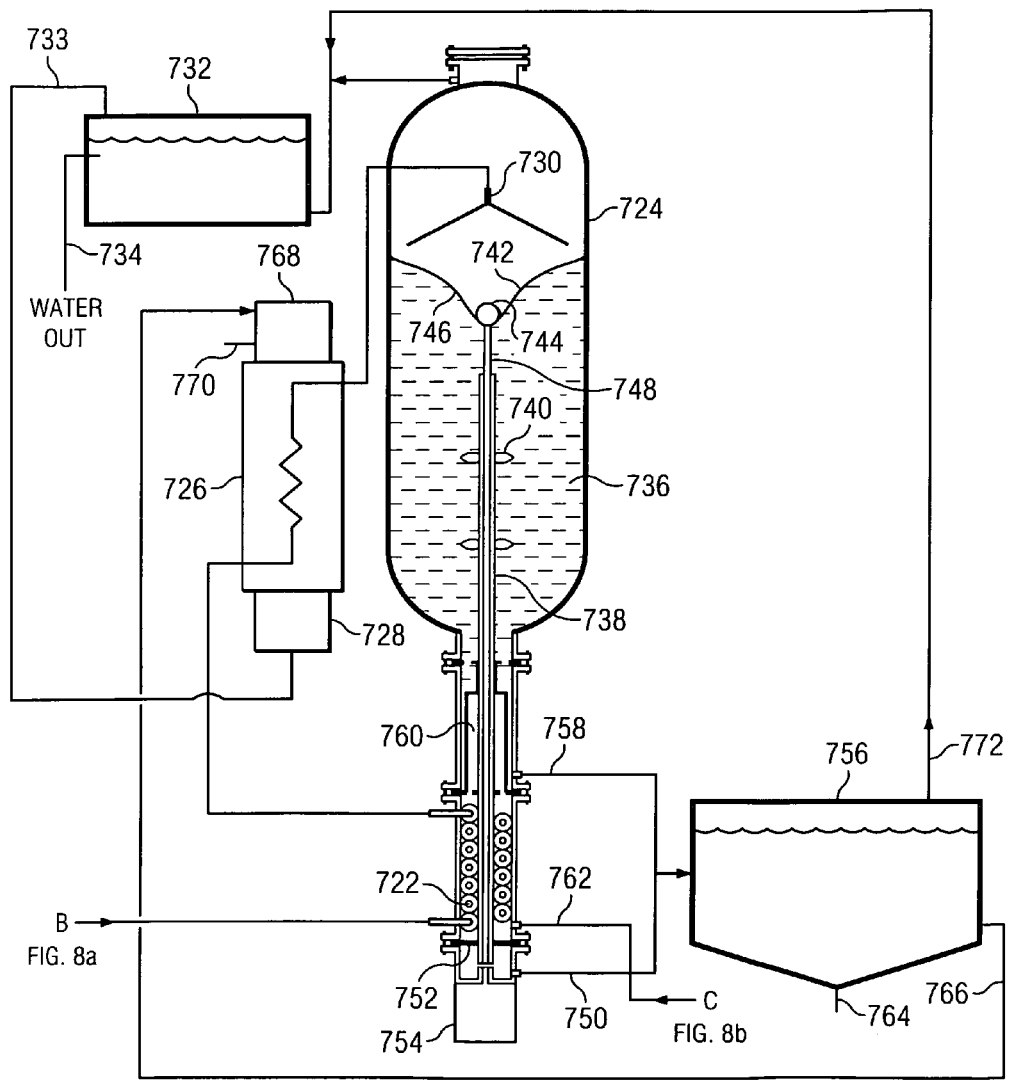
FIG. 10 illustrates another technique and apparatus for separating liquids with different densities during the water purification process.

FIG. 10 illustrates another embodiment 720 of the invention adapted for efficiently separating liquids of different densities during the purification process. In other words, the production water is preprocessed to remove many chemical impurities, particulate matter and gasses prior to the flash evaporation process. This preprocessing also removes material from the production liquid that would otherwise be detrimental to the high pressure pump 144. Feed water from the filtration equipment 550 of FIG. 8a is coupled at point "B" to the bottom input of a helical coil 722 located within the bottom portion of a tank or container 724 in which the liquids are separated by densities. The production feed water passes through the helical coil 722 and is preheated therein, as the liquid surrounding the coil 722 has a much higher temperature. The preheated production water outlet from the top of the helical coil 722 is coupled to the input of a helical coil heat exchanger apparatus 726 that is heated by a 400,000 BTU/hour burner 728. The temperature of the production water is heated to about 240 F in the heat exchanger 726.

The high temperature production liquid or water is then coupled to the top of the liquid density separation container 724, and to a nozzle 730 that sprays the hot production liquid in a cone-shaped pattern toward the outer periphery of the container 724. The nozzle can be of conventional construction to form the spray in a cone-shaped pattern. The nozzle 730 can be stationary or of the rotating type. The spray of the hot production water is preferably toward the inner surface of the container 724 where it runs down and enters the pool of the liquid mixture 736. The top of the container 724 is equipped with an access port and a sight glass to provide a visual indication of the operation occurring within the container 724.

The water and the oil or petroleum products in the production water have different densities, with the density of water being greater. When heated by the burner 728 and heat exchanger 726, the differential in the densities of the liquids is even greater, thus facilitating separation of the different liquids. The heating of the production liquid more readily enables the volatile gasses to be released to thereby degas the liquid. The volatile gasses embedded in the production liquid are released as corresponding vapors in the container 724. A small portion of the water in the production liquid flashes into steam when emitted from the nozzle 730. The steam and vapors rise to the top of the container 724 and exits therefrom to a condenser 732 that condenses the steam into a purified form of water. The condenser 732 can be of a variety of different types, including a bubbler type condenser. The volatile gasses are not condensed, but pass through a top port 733 of the condenser 732.

The vapors and gasses generated in the container 724 are carried to an inlet of the condenser 732, and transferred through the condenser 732 to the top port 733 thereof. From the condenser 732, the vapors and gasses are fed back to the burner 728 for facilitating combustion and enhancing the efficiency of the system. The purified form of water from the condenser output 734 is fed to the output of the water purification system 18.

The production liquid that is processed and sprayed from the nozzle 730 in the container 724 includes a substantial amount of water, oil and other liquids that do not flash in the environment of the container 724. The liquids that do not flash in the container 724 fall and collect in the bottom portion of the liquid density separation container 724 and form a pool 736 of mixed liquid types. The liquid mixture 736 in the lower portion of the container 724 has different densities. It is realized that the lighter density liquids will generally rise to the top of the liquid mixture 736, and the heavier density liquids will settle to the bottom. With regard to mixed water and petroleum liquids 736, water is heavier than the petroleum liquid, whereupon the water settles to the bottom of the container 724 and the petroleum rises to the top of the mixed liquid composition 736.

The separation of the various-density liquids 736 in the lower portion of the container 724 is facilitated by the use of a rotating tubular member 738 equipped with one or more impellers 740. The rotating impellers 740 impart a swirl and circular motion to the hot liquid mixture 736 to facilitate separation of the different density liquids 736. The number, size and pitch of the impellers 740, together with the rotational speed of the tubular shaft 738 (1-2 rpm) are selected so that a vortex 742 is formed in the top surface of the liquid mixture 736. The vortex 742 is generally shaped like an inverted cone or funnel, with the central part of the vortex cone 742 located at the middle of the container 724. However, the general vertical location of the cone-shaped surface 746 of the liquid mixture 736 varies in the container 724 during processing of the production liquid. As noted above, the hot liquid mixture emitted from the nozzle 730 enters the pool 736 at the periphery of the vortex cone 742. Importantly, the lighter density liquids (oils) gravitate to the center of the vortex cone 742, while the heavier density liquids (water) migrate toward the outer periphery of the vortex cone 742. This separation is facilitated by a number of considerations, including the use of the nozzle 730 which sprays the production liquid to the periphery of the container 724, the high temperature of the production liquid, and the swirling motion of the hot production liquid to form a vortex cone 742.

From the foregoing, the separation of the water from the oils in the production water is carried out using both the action of gravity as well as centrifugal force. With the dual forces acting on the liquid mixture 736, the higher density water not only settles to the bottom, but is also dispersed to the outer top periphery of the pool 736. The lighter density oils not only rise to the top, but also migrate to the middle of the vortex cone 742. Because of the cone-shaped spray of the production liquid from the nozzle 730, the higher density water remains along the periphery of the container 724 and moves downwardly to the bottom of the container 724 where it is removed.

In accordance with an important feature of the invention, a floatation ball 744 is fixed to the end of an apertured tube 748 that telescopically extends through the impeller tubular member 738. The ball 744 is preferably constructed of metal, is hollow, and welded to the end of the apertured tube 748. The ball 744 floats in the apex portion of the vortex cone 742, and as the surface level of the liquid mixture 736 rises, the ball 744 rises and carries with it the apertured tube 748. As the surface level of the liquid mixture 736 falls, the ball 744 falls with it and the apertured tube 748 recedes within the impeller tubular member 738. Importantly, only the upper portion of the apertured tube 748 is apertured so that the lighter density liquids, such as the oils that float on the water in the center of the container 724, enter into the apertured tube 748 and are carried to the bottom of the container 724 to an outlet 750. The bottom-most portion of the container 724 where the heavier density liquids are collected is sealed by a seal 752 from the portion of the container thereabove housing the helical coil 722. A variable-speed DC motor 754 is mounted to the bottom center of the container 724 to rotate the impeller tubular member 738. The tubular impeller member 738 is rotationally mounted and sealed in the various members through which it passes.

The lighter density liquids continuously collected in the apertured tube 748 and output from the container 724 are coupled to a settling tank 756. Unflashed water in the container 724 settles to the bottom thereof because the density is greater than that of the oil substances. The unflashed water together with particulate matter and other residue therein at the bottom of the container 724 are outlet via outlet 758 to the settling tank 756. Within the bottom of the container 724, there is a water filtration member 760 that is effective to remove the particulate matter and residue from the water so that water passes therethrough and is filtered and carried to an outlet 762. The filtered water output from the outlet 762 is more purified than the water output from outlet 758 to the settling tank 756. The filtered water passes from outlet 762 and is coupled to "C" in FIG. 10 which is the input of the high pressure pump 144 of FIG. 8b. From the high pressure pump 144, the preprocessed production liquid proceeds in the manner described above in connection with FIGS. 8c and 9.

It can be understood that by preprocessing the production liquid by the subsystem of FIG. 10, the heavy duty and toxic impurities, including the oils and vapors, are separated from the water portion of the liquid. The water output from the outlet 762 of the container 724, while yet contaminated with many impurities, is acceptable for further processing by the flash evaporation system of the invention.

The settling tank 756 includes a bottom outlet 764 through which the solids are removed and carried as a slurry to a sludge tank for temporary storage until emptied and disposed of appropriately. Water and other low density liquids in the top portion of the settling tank 756 are coupled via an outlet 766 to a flue scrubber 768 that is connected to the top of the burner 728 and the heat exchanger unit 726. The scrubber 768 includes a soot water outlet 770. The settling tank 756 also includes a top outlet 772 for extracting vapors from within the settling tank and coupling the same back to the condenser 732. As noted above, the vapors within the condenser 732 are coupled to the burner 728 for combusting together with the fuel fed to the burner 728.

While the separation technique described above is well adapted for use in separating gasses and oils from water, the technique can be adapted for use in purifying or separating different density liquids from each other during dynamic processing of the liquid mixture. In other words, a feature of the invention is that the separation process is on going and dynamic in the same container, and thus only a single container is required to continuously process the liquid mixture.

While the various embodiments of the water purification systems have been described using nozzles or orifices for the conversion of hot water into steam, many other styles and types of nozzles and orifices can be employed. In other words, because a particular nozzle may be employed and may constitute an invention in itself, the particular nozzle is not necessary or critical to the practice of the water purification systems described herein. To that end, a spring-loaded nozzle can be employed in which a stem is spring loaded so that the orifice area is a function of the spring compression force and the pressure of the liquid to be forced through the variable-area orifice. As such, a nozzle as described in U.S. Pat. No. 3,488,925 can be employed.

While the different water purification systems have been disclosed with various associated features, it should be understood that the various features can be used with any of the systems, and are not necessarily dedicated to the system disclosed in connection therewith. In other words, the various features disclosed herein can be mixed and matched to the system of choice to achieve the individual advantages.

While the preferred and other embodiments of the invention have been disclosed with reference to specific water purification systems and corresponding structures, it is to be understood that many changes in detail may be made as a matter of engineering choices without departing from the spirit and scope of the invention, as defined by the appended claims.

What is claimed is:

1. A water purification system for processing an aqueous liquid from a hydrocarbon well, comprising:
   said water purification system located at a site of the hydrocarbon well and having an input for receiving the aqueous liquid from the hydrocarbon well;
   the aqueous liquid is coupled to the input of the water purification system without prior pretreatment thereof to remove particulate matter and entrapped gasses in solution;
   a separation container for processing the aqueous liquid to remove at least some organic and inorganic components therefrom to provide a processed aqueous liquid;
   a heater for heating the processed aqueous liquid, said heater using only a hydrocarbon fuel from a hydrocarbon fuel source at the well site, said hydrocarbon fuel used for combustion in said heater to provide thermal energy to heat the processed aqueous liquid;
   an expansion chamber having a nozzle;
   a pump for pumping the heated processed aqueous liquid through the nozzle of the expansion chamber to flash evaporate the water from the heated processed aqueous liquid into steam;
   an electrical generator for generating electricity;
   an engine for driving said electrical generator, said engine using the hydrocarbon fuel from the hydrocarbon fuel source; and
   whereby the water purification system operates autonomously at the well site without requiring said preprocessing of the aqueous liquid from the hydrocarbon well and without requiring fuel to be transported to the well site and used by the heater and the engine.

2. The water purification system of claim 1, wherein said engine comprises one of an internal combustion engine or a turbine engine.

3. The water purification system of claim 1, wherein one hydrocarbon component separated from the aqueous liquid in said separation container comprises hydrocarbon vapors, said separation container including a nozzle for spraying the aqueous liquid into said separation container to facilitate separation of the hydrocarbon vapors from the aqueous liquid.

4. The water purification system of claim 3, wherein said nozzle is adapted to spray said aqueous liquid as a mist into said separation chamber to thereby separate entrapped gasses from said aqueous liquid.

5. The water purification system of claim 3, further including a return duct for carrying volatile vapors from said separation chamber to said heater.

6. The water purification system of claim 1, further including a condenser for condensing the steam into a purified form of water.

7. The water purification system of claim 6, wherein said engine comprises a steam turbine driven by said steam, and said electrical generator is driven by said steam turbine for generating electricity.

8. The water purification system of claim 1, wherein said engine comprises an internal combustion reciprocating engine supplied with natural gas from said hydrocarbon well.

9. The water purification system of claim 1, wherein thermal energy generated by said engine is used to preheat the aqueous liquid from said hydrocarbon well.

10. The water purification system of claim 1, wherein said engine generates thermal energy, and further including a conduit for coupling the thermal energy generated by said engine to heat a liquid processed by said water purification system.

11. The water purification system of claim 10, wherein said engine includes a block with a liquid circulating therein, and the liquid circulating in said engine block is used to heat the liquid processed by said water purification system.

12. The water purification system of claim 1, further including electrical control circuits for controlling operation of said water purification system, and further including an AC/DC converter for converting the AC electricity from said electrical generator to a DC voltage for use by said electrical control circuits.

13. The water purification system of claim 1, further including a rotating paddle in said separation container to rotate the aqueous liquid therein and form a vortex, and further including a floating collector floating at a bottom of the vortex to collect liquids lighter in weight than water and to remove the lighter-than-water liquids from the separation chamber.

14. The water purification system of claim 13, further including a preheater for preheating the aqueous liquid, and including a nozzle in said separation container for spraying the preheated aqueous liquid toward an outer surface of the separation container, whereby separation of water from the rotating preheated aqueous liquid in said separation chamber is facilitated.

15. The water purification system of claim 14, wherein said aqueous liquid is preheated by excess thermal energy generated by said water purification system.

16. The water purification system of claim 1, wherein said expansion chamber nozzle includes a nozzle member that is spring biased to a closed position, but said nozzle member is opened by the pressure by which said pump pumps the heated processed aqueous liquid through said nozzle.

17. The water purification system of claim 1, wherein said water purification system is contained so that volatile gasses are extracted from the aqueous liquid and incinerated by a burner.

18. The water purification system of claim 1, wherein said water purification system includes apparatus to processes the aqueous liquid to produce drinkable water, and said separation container produces wastes, and wherein said water purification system heats the aqueous liquid sufficiently to kill bacteria when producing the drinkable water and the wastes, said water purification system using thermal energy to kill the bacteria without using chemicals to kill the bacteria.

19. A water purification system for processing an aqueous liquid from a hydrocarbon well, comprising:
   said water purification system being portable and movable for well site to well site without being disassembled;
   said water purification system located at a site of the hydrocarbon well and having an input for receiving the aqueous liquid from the hydrocarbon well without pretreatment thereof to remove particulate matter and embedded gasses;
   a preheater for preheating the aqueous liquid from the hydrocarbon well, said preheater using excess thermal energy generated by said water purification system;
   a separation container having a nozzle therein for spraying the preheated aqueous liquid to facilitate removal of volatile gasses therefrom to provide a degassed aqueous liquid that collects at a bottom of the separation container, and the preheated aqueous liquid collected at the bottom of the separation container releases gasses due to the elevated temperature of the preheated aqueous liquid, said separation container including a gas discharge outlet from said separation container;
   a heater for heating the degassed aqueous liquid, said heater using a hydrocarbon fuel from a hydrocarbon fuel source at the well site, and said heater using the volatile gasses discharged from the discharge outlet of said separation container as a fuel, the fuels used for combustion in said heater providing thermal energy to heat the degassed aqueous liquid;
   an expansion chamber having a nozzle;
   a pump for pumping the heated degassed aqueous liquid through the nozzle of the expansion chamber to flash evaporate water from the heated degassed aqueous liquid;
   an electrical generator for generating electricity;
   an engine for driving said electrical generator, said engine using the hydrocarbon fuel from the hydrocarbon fuel source; and
   whereby the water purification system operates autonomously at the well site without requiring said preprocessing of the aqueous liquid from the hydrocarbon well and without requiring fuel to be transported to the well site for the heater and the engine.

20. The water purification system of claim 19, wherein said preheater heats the aqueous liquid to a temperature of 200 degrees F. or greater, and said separation container is held at a positive pressure with respect to atmospheric pressure.

21. The water purification system of claim 19, further including a rotating paddle in said separation container for swirling the aqueous liquid to form a central vortex to collect liquids lighter in weight than water at a center of the separation container, and a floating liquid removal mechanism floating in the vortex to remove the lighter-than-water liquids.

22. A method of operating a water purification system for processing an aqueous liquid from a hydrocarbon well, comprising:
   transporting the water purification system as one or more units to a site of the hydrocarbon well, and connecting the water purification system units together so that liquids to be processed can flow between the connected water purification system units;
   preheating the aqueous liquid from the hydrocarbon well and spraying the preheated aqueous liquid into a separation container to separate gasses therefrom to provide a degassed aqueous liquid, and extracting the gasses from the separation container;
   using gas from a gas source at the well site to generate thermal energy to heat the degassed aqueous liquid produced by the separation container;
   pressurizing the heated degassed aqueous liquid and flashing water in the heated degassed aqueous liquid into steam;
   condensing the steam to provide a purified form of water; and
   using gas from the gas source to drive an engine to drive an AC generator to generate electrical power used by control circuits that control operation of the water purification system.

23. The method of claim 22, further including a transmission line for coupling AC power generated by said AC generator to off site consumers of the AC power.

24. The method of claim 22, further including reducing the cost of purifying the aqueous liquid from the hydrocarbon well into the purified form of water by selling the AC power generated by said AC generator to consumers.

25. The method of claim 22, further including using thermal energy from said engine to heat a liquid processed by the water purification system.

26. The method of claim 22, further including adding no chemicals to the aqueous liquid prior to preheating thereof.

* * * * *